United States Patent
Taherzadeh Boroujeni et al.

(10) Patent No.: US 12,232,183 B2
(45) Date of Patent: Feb. 18, 2025

(54) ALTERNATIVE DEMODULATION REFERENCE SIGNAL FOR REPETITIONS OF A RANDOM ACCESS RESPONSE PHYSICAL DOWNLINK CONTROL CHANNEL COMMUNICATION

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 17/305,695

(22) Filed: Jul. 13, 2021

(65) Prior Publication Data

US 2022/0053574 A1     Feb. 17, 2022

Related U.S. Application Data

(60) Provisional application No. 63/065,383, filed on Aug. 13, 2020, provisional application No. 63/064,636, filed on Aug. 12, 2020.

(51) Int. Cl.
| | |
|---|---|
| *H04W 74/0833* | (2024.01) |
| *H04L 1/1867* | (2023.01) |
| *H04L 5/00* | (2006.01) |
| *H04L 27/26* | (2006.01) |
| *H04W 74/00* | (2009.01) |
| *H04W 74/0836* | (2024.01) |

(52) U.S. Cl.
CPC ....... *H04W 74/0841* (2013.01); *H04L 5/0051* (2013.01); *H04L 27/2607* (2013.01); *H04W 74/006* (2013.01)

(58) Field of Classification Search
CPC ............ H04W 74/0841; H04W 74/006; H04L 5/0051; H04L 27/2607
USPC .......................................................... 370/329
See application file for complete search history.

(56) References Cited

U.S. PATENT DOCUMENTS

| | | | |
|---|---|---|---|
| 2012/0282936 A1* | 11/2012 | Gao | H04L 5/0023 455/450 |
| 2016/0037491 A1* | 2/2016 | Hwang | H04L 5/0053 370/330 |

(Continued)

FOREIGN PATENT DOCUMENTS

| | | |
|---|---|---|
| EP | 3986050 A1 * | 4/2022 |
| WO | WO-2020249844 A1 * | 12/2020 |
| WO | WO-2021231816 A1 * | 11/2021 |

OTHER PUBLICATIONS

Samsung (R1-1717641, "On PDCCH structure", Oct. 9-13, 2017) (Year: 2017).*

*Primary Examiner* — Xuan Lu
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of an alternative configuration associated with demodulation reference signals (DMRSs) for one or more repetitions of a physical downlink control channel (PDCCH) communication associated with a random access response message. The UE may receive at least one repetition of the PDCCH communication that includes a DMRS that uses the alternative configuration. Numerous other aspects are provided.

30 Claims, 17 Drawing Sheets

(56) References Cited

U.S. PATENT DOCUMENTS

| | | | | |
|---|---|---|---|---|
| 2016/0302175 | A1* | 10/2016 | Blankenship | H04L 5/0096 |
| 2019/0253308 | A1* | 8/2019 | Huang | H04B 7/0695 |
| 2020/0145972 | A1* | 5/2020 | Kwak | H04W 72/042 |
| 2020/0154467 | A1* | 5/2020 | Gong | H04W 72/12 |
| 2020/0178281 | A1* | 6/2020 | Bhamri | H04W 76/27 |
| 2020/0367242 | A1* | 11/2020 | Moon | H04L 5/0053 |
| 2021/0227512 | A1* | 7/2021 | Solano Arenas | H04L 5/0082 |
| 2022/0039140 | A1* | 2/2022 | Yi | H04L 5/0053 |
| 2022/0046679 | A1* | 2/2022 | Yeo | H04L 27/26025 |
| 2022/0394696 | A1* | 12/2022 | Liu | H04L 27/2613 |

* cited by examiner

ALTERNATIVE DEMODULATION REFERENCE SIGNAL FOR REPETITIONS OF A RANDOM ACCESS RESPONSE PHYSICAL DOWNLINK CONTROL CHANNEL COMMUNICATION

CROSS-REFERENCE TO RELATED APPLICATIONS

This Patent Application claims priority to U.S. Provisional Patent Application No. 63/064,636, filed on Aug. 12, 2020, entitled "ALTERNATIVE DEMODULATION REFERENCE SIGNAL FOR REPETITIONS OF A RANDOM ACCESS RESPONSE PHYSICAL DOWNLINK CONTROL CHANNEL COMMUNICATION," and assigned to the assignee hereof; and to U.S. Provisional Patent Application 63/065,383, filed on Aug. 13, 2020, entitled "METHODS AND APPARATUS TO FACILITATE BLIND DETECTION OF MESSAGE2 PHYSICAL DOWNLINK CONTROL CHANNEL (PDCCH) REPETITION NUMBER VIA DEMODULATION REFERENCE SIGNALS (DMRS)," and assigned to the assignee hereof. The disclosures of the prior Applications are considered part of and are incorporated by reference into this Patent Application.

FIELD OF THE DISCLOSURE

Aspects of the present disclosure generally relate to wireless communication and to techniques and apparatuses for alternative demodulation reference signal configuration for repetitions of a random access response physical downlink control channel communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving an indication of an alternative configuration associated with demodulation reference signals (DMRSs) for one or more repetitions of a physical downlink control channel (PDCCH) communication associated with a random access response (RAR) message; and receiving at least one repetition of the PDCCH communication that includes a DMRS that uses the alternative configuration.

In some aspects, a method of wireless communication performed by a base station includes transmitting an indication of an alternative configuration associated with DMRSs for one or more repetitions of a PDCCH communication associated with an RAR message; and transmitting at least one repetition of the PDCCH communication that includes a DMRS that uses the alternative configuration.

In some aspects, a UE for wireless communication includes a memory and one or more processors coupled to the memory, configured to: receive an indication of an alternative configuration associated with DMRSs for one or more repetitions of a PDCCH communication associated with an RAR message; and receive at least one repetition of the PDCCH communication that includes a DMRS that uses the alternative configuration.

In some aspects, a base station for wireless communication includes a memory and one or more processors coupled to the memory, configured to: transmit an indication of an alternative configuration associated with DMRSs for one or more repetitions of a PDCCH communication associated with an RAR message; and transmit at least one repetition of the PDCCH communication that includes a DMRS that uses the alternative configuration.

In some aspects, a non-transitory computer-readable medium storing a set of instructions for wireless communication includes one or more instructions that, when executed by one or more processors of a UE, cause the UE to: receive an indication of an alternative configuration associated with DMRSs for one or more repetitions of a PDCCH communication associated with an RAR message; and receive at least one repetition of the PDCCH communication that includes a DMRS that uses the alternative configuration.

In some aspects, a non-transitory computer-readable medium storing a set of instructions for wireless communication includes one or more instructions that, when executed by one or more processors of a base station, cause the base station to: transmit an indication of an alternative configuration associated with DMRSs for one or more repetitions of a PDCCH communication associated with an RAR message;

and transmit at least one repetition of the PDCCH communication that includes a DMRS that uses the alternative configuration.

In some aspects, an apparatus for wireless communication includes means for receiving an indication of an alternative configuration associated with DMRSs for one or more repetitions of a PDCCH communication associated with an RAR message; and means for receiving at least one or more repetition of the PDCCH communication that includes a DMRS that uses the alternative configuration.

In some aspects, an apparatus for wireless communication includes means for transmitting an indication of an alternative configuration associated with DMRSs for one or more repetitions of a PDCCH communication associated with an RAR message; and means for transmitting at least one repetition of the PDCCH communication that includes a DMRS that uses the alternative configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
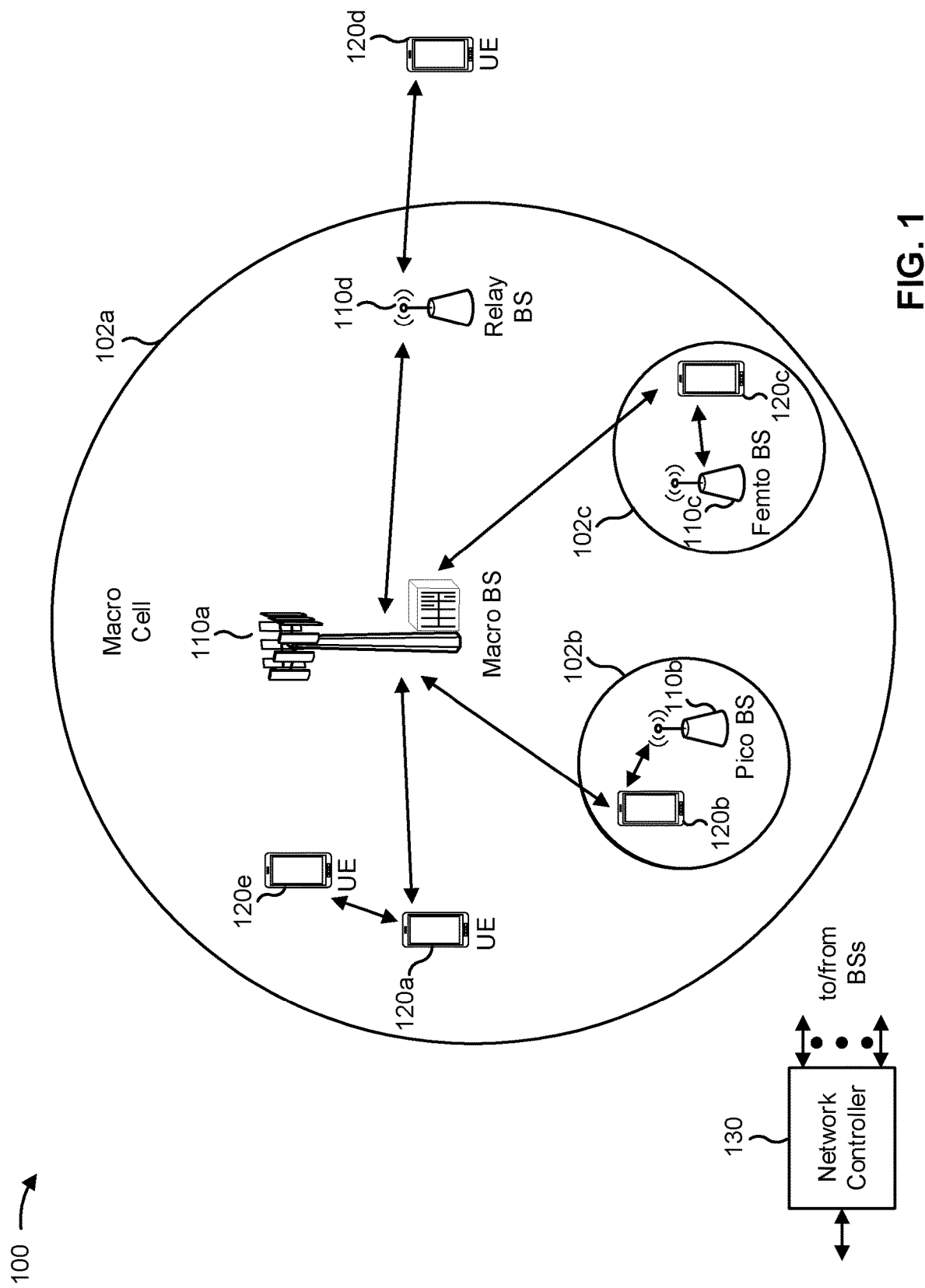
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
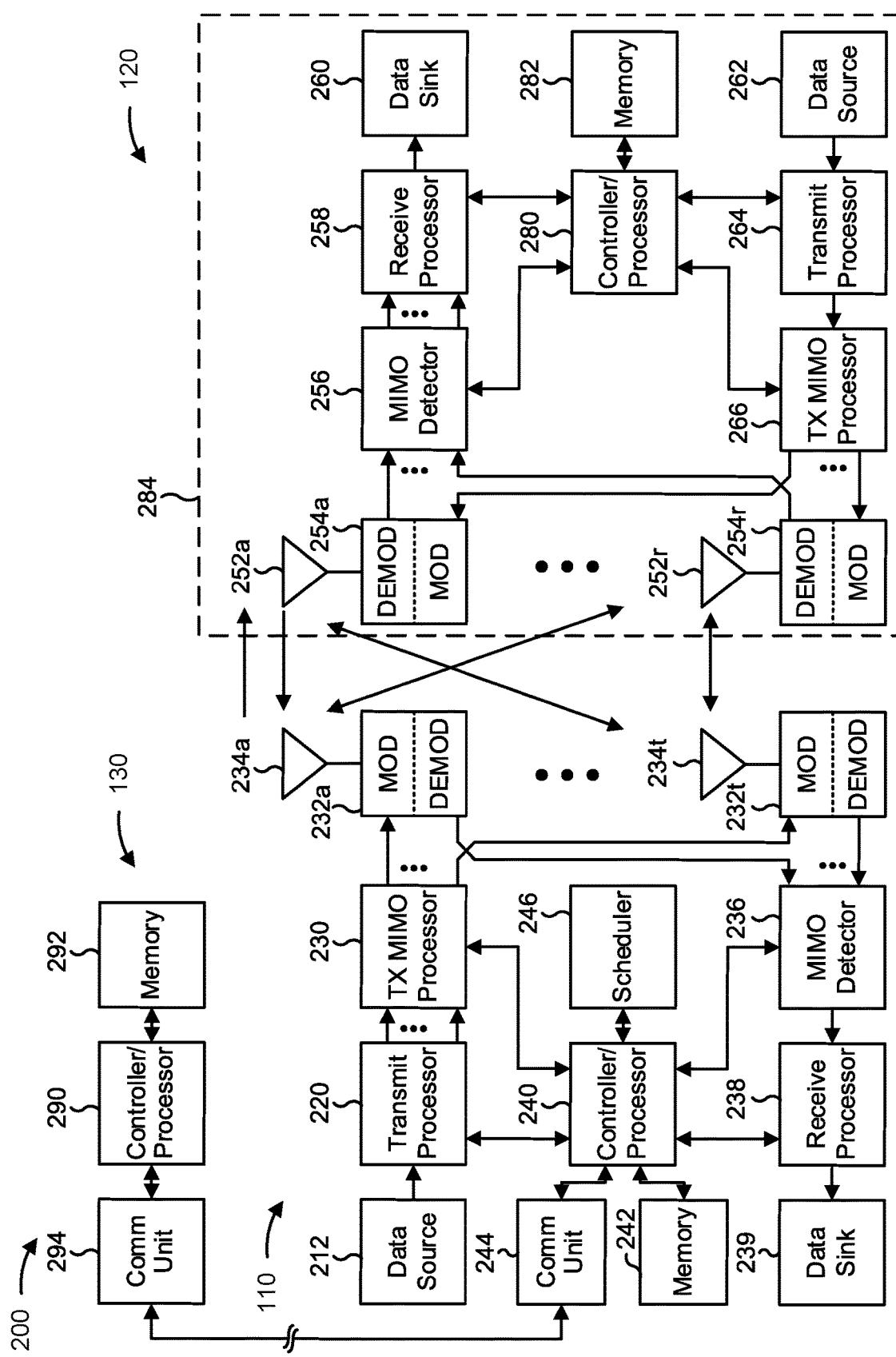
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-13).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-13).

Controller/processor 240 of base station 110, controller/processor 280 of UE 120, and/or any other component(s) of FIG. 2 may perform one or more techniques associated with an alternative DMRS configuration for repetitions of an RAR PDCCH communication, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

In some aspects, UE 120 may include means for receiving an indication of an alternative configuration associated with DMRSs for one or more repetitions of a PDCCH communication associated with an RAR message; means for receiving a repetition of the PDCCH communication that includes a DMRS that does not use the alternative configuration; means for receiving the one or more repetitions of the PDCCH communication that include DMRSs that use the alternative configuration; means for detecting a DMRS in a control data candidate of a set of control data candidates received while monitoring for a random access response from a base station; and/or means for determining a number of repetitions of control data candidates of the set of control data candidates based on the DMRS, wherein each control data candidate corresponds to at least one of an aggregated slot and an aggregated monitoring occasion; among other examples. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting an indication of an alternative configuration associated with DMRSs for one or more repetitions of a PDCCH communication associated with an RAR message; means for transmitting a repetition of the PDCCH communication that includes a DMRS that does not use the alternative configuration; means for transmitting the one or more repetitions of the PDCCH communication that include DMRSs that use the alternative configuration; means for receiving a first random access message from a UE; means for transmitting a random access response to the UE with repetition; and/or means for transmitting a DMRS in a control data candidate of a set of control data candidates, wherein the DMRS indicates that the random access response is transmitted with repetition; among other examples. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
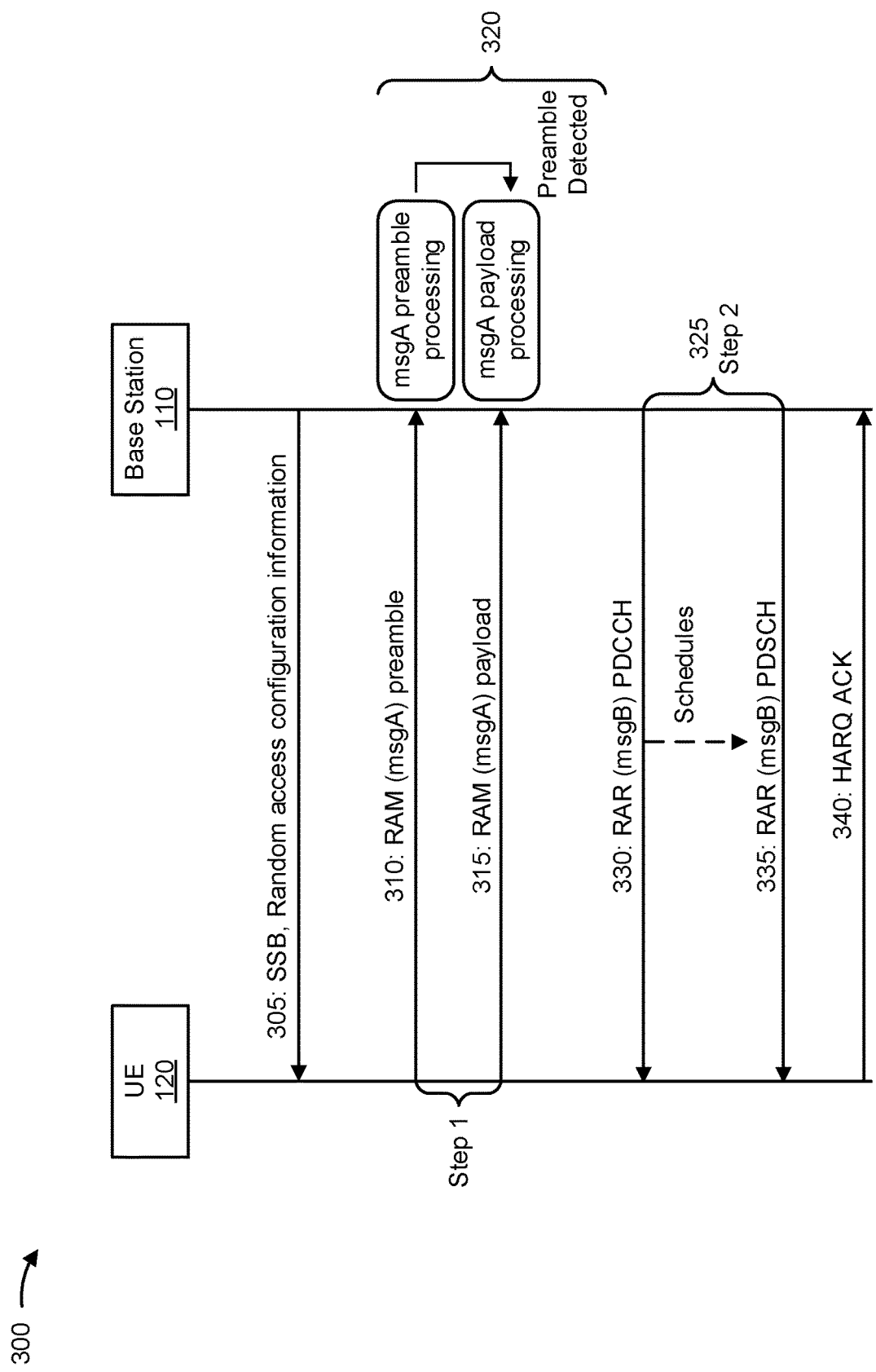
FIG. 3 is a diagram illustrating an example of a two-step random access procedure, in accordance with the present disclosure.

FIG. 3 is a diagram illustrating an example 300 of a two-step random access procedure, in accordance with the present disclosure. As shown in FIG. 3, a base station 110 and a UE 120 may communicate with one another to perform the two-step random access procedure.

As shown by reference number 305, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a PDCCH order message that triggers a random access channel (RACH) procedure, such as for contention-free random access. The random access configuration information may include one or more parameters to be used in the two-step random access procedure, such as one or more parameters for transmitting a random access message (RAM), receiving a random access response (RAR) to the RAM, and/or the like.

As shown by reference number 310, the UE 120 may transmit, and the base station 110 may receive, a RAM preamble. As shown by reference number 315, the UE 120 may transmit, and the base station 110 may receive, a RAM payload. As shown, the UE 120 may transmit the RAM preamble and the RAM payload to the base station 110 as part of an initial (or first) step of the two-step random access procedure. In some aspects, the RAM may be referred to as message A, msgA, a first message, an initial message, and/or the like in a two-step random access procedure. Furthermore, in some aspects, the RAM preamble may be referred to as a message A preamble, a msgA preamble, a preamble, a physical random access channel (PRACH) preamble, and/or the like, and the RAM payload may be referred to as a message A payload, a msgA payload, a payload, and/or the like. In some aspects, the RAM may include some or all of the contents of message 1 (msg1) and message 3 (msg3) of a four-step random access procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), a physical uplink shared channel (PUSCH) transmission, and/or the like).

As shown by reference number 320, the base station 110 may receive the RAM preamble transmitted by the UE 120. If the base station 110 successfully receives and decodes the RAM preamble, the base station 110 may then receive and decode the RAM payload.

As shown by reference number 325, the base station 110 may transmit an RAR (sometimes referred to as an RAR message). As shown, the base station 110 may transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, contention resolution information, and/or the like.

As shown by reference number 330, as part of the second step of the two-step random access procedure, the base station 110 may transmit a PDCCH communication for the RAR. The PDCCH communication may schedule a physical downlink shared channel (PDSCH) communication that includes the RAR. For example, the PDCCH communication may indicate a resource allocation (e.g., in downlink control information (DCI)) for the PDSCH communication.

As shown by reference number 335, as part of the second step of the two-step random access procedure, the base station 110 may transmit the PDSCH communication for the RAR, as scheduled by the PDCCH communication. The RAR may be included in a medium access control (MAC) protocol data unit (PDU) of the PDSCH communication. As shown by reference number 340, if the UE 120 successfully receives the RAR, the UE 120 may transmit a hybrid automatic repeat request (HARD) acknowledgement (ACK).

As indicated above, FIG. 3 is provided as an example. Other examples may differ from what is described with regard to FIG. 3.

Figure 4:
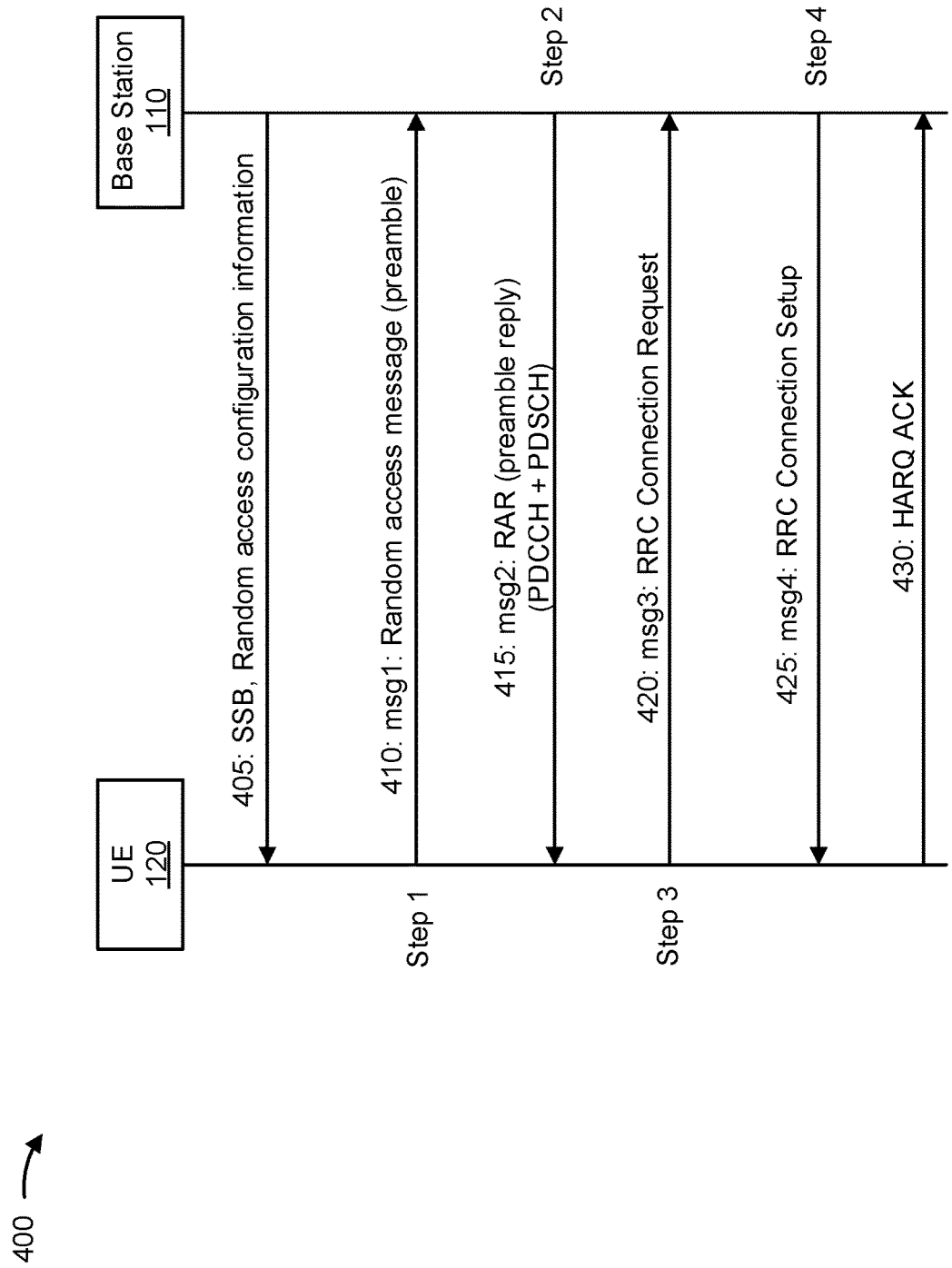
FIG. 4 is a diagram illustrating an example of a four-step random access procedure, in accordance with the present disclosure.

FIG. 4 is a diagram illustrating an example 400 of a four-step random access procedure, in accordance with the present disclosure. As shown in FIG. 4, a base station 110 and a UE 120 may communicate with one another to perform the four-step random access procedure.

As shown by reference number 405, the base station 110 may transmit, and the UE 120 may receive, one or more SSBs and random access configuration information. In some aspects, the random access configuration information may be transmitted in and/or indicated by system information (e.g., in one or more SIBs) and/or an SSB, such as for contention-based random access. Additionally, or alternatively, the random access configuration information may be transmitted in an RRC message and/or a PDCCH order message that triggers a RACH procedure, such as for contention-free random access. The random access configuration information may include one or more parameters to be used in the random access procedure, such as one or more parameters for transmitting a RAM, one or more parameters for receiving an RAR, and/or the like.

As shown by reference number 410, the UE 120 may transmit a RAM, which may include a preamble (sometimes referred to as a random access preamble, a PRACH preamble, a RAM preamble, and/or the like). The message that includes the preamble may be referred to as a message 1, msg1, MSG1, a first message, an initial message, and/or the like in a four-step random access procedure. The random access message may include a random access preamble identifier.

As shown by reference number 415, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the base station 110 may transmit a PDCCH communication for the RAR. The PDCCH communication may schedule a PDSCH communication that includes the RAR. For example, the PDCCH communication may indicate a resource allocation for the PDSCH communication. Also, as part of the second step of the four-step random access procedure, the base station 110 may transmit the PDSCH communication for the RAR, as scheduled by the PDCCH communication. The RAR may be included in a MAC PDU of the PDSCH communication.

As shown by reference number 420, the UE 120 may transmit an RRC connection request message. The RRC connection request message may be referred to as message 3, msg3, MSG3, or a third message of a four-step random access procedure. In some aspects, the RRC connection request may include a UE identifier, UCI, a PUSCH communication (e.g., an RRC connection request), and/or the like.

As shown by reference number 425, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, contention resolution information, and/or the like. As shown by reference number 430, if the UE 120 successfully receives the RRC connection setup message, the UE 120 may transmit a HARQ ACK.

As indicated above, FIG. 4 is provided as an example. Other examples may differ from what is described with regard to FIG. 4.

Figure 5:
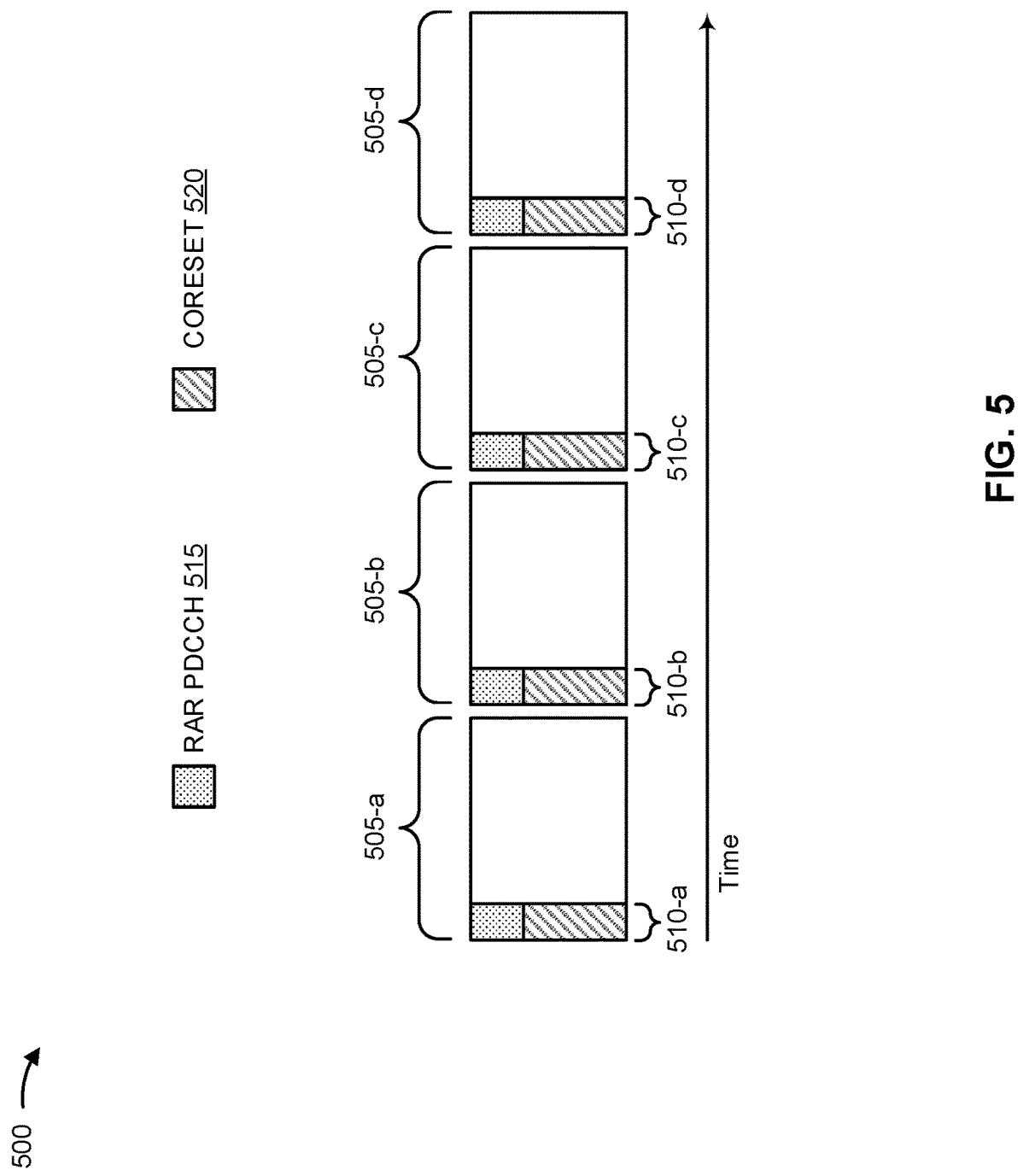
FIG. 5 is a diagram illustrating an example of a random access response (RAR) physical downlink control channel (PDCCH) communication repetition scheme, in accordance with the present disclosure

FIG. 5 is a diagram illustrating an example 500 of an RAR PDCCH communication repetition scheme, in accordance with the present disclosure. In some aspects, example 500 may illustrate how a base station 110 may transmit a number of repetitions of control information (e.g., PDCCH communications) associated with an RAR in a number of consecutive slots. Based at least in part on using the PDCCH repetition scheme, a UE 120 may be more likely to connect to the base station 105 using a random access procedure during a low connectivity condition.

In some wireless communications systems, a UE 120 may attempt to connect to a base station 110 using a random access procedure and the UE 120 may transmit a random access request to the base station 110. The base station 110 may respond to the random access request by transmitting, to the UE 120, a PDCCH communication carrying control information associated with a random access response (RAR) during an RAR window. In some aspects, the base station 110 may transmit the PDCCH communication without repetition. In some aspects, the base station 110 may transmit the PDCCH communication in one or more repetitions according to a configuration of the RAR window. The UE 120 may receive multiple transmissions or copies (e.g., repetitions) of the PDCCH communication and may combine the multiple transmissions prior to decoding and performing a parity check. The UE 120 may decode the combination of the multiple transmissions and identify a location (e.g., a time location and/or a frequency location) for receiving the RAR from the base station 110.

For example, the base station 110 may transmit repetitions of the PDCCH communication associated with the RAR in a number of slots. In some aspects, the base station 110 may repeatedly transmit identical copies of the PDCCH communication associated with the RAR. In some aspects, the number of slots may be consecutive. In some aspects, the base station 110 may transmit each repetition of the PDCCH communication in the same location of each of the number of consecutive slots (e.g., at the beginning of each slot 505-a, 505-b, 505-c, and 505-d, as depicted in FIG. 5).

The PDCCH repetition scheme depicted in FIG. 5 may include a number of slots, such as slot 505-a, slot 505-b, slot 505-c, and slot 505-d. A control resource set (CORESET) 520 may be included in each slot, and a repetition of an RAR PDCCH communication 515 (e.g., RAR control information) may be included inside each CORESET 520. In some aspects, each repetition of the RAR PDCCH communication 515 may be in the same location in each of the number of slots 505. For example, the base station 110 may transmit all repetitions of the RAR PDCCH communication 515 associated with the same RAR such that the UE 120 may receive the RAR PDCCH communication 515 at monitoring occasions 510-a, 510-b, 510-c, and 510-d (e.g., at the same location in each consecutive slot). Additionally or alternatively, each repetition of the RAR PDCCH communication 515 may be associated with the same repetition level, and the UE 120 may identify the repetition level of each instance of the RAR PDCCH communication 515 to identify which instances of RAR PDCCH communication 515 may be linked (e.g., combined). For example, each repetition of the RAR PDCCH communication 515 may include the same number of control channel elements (CCEs). Additionally or alternatively, each repetition of the RAR PDCCH communication 515 may be associated with an index that the UE 120 may use to link (e.g., combine) a number of repetitions of the RAR PDCCH communication 515. In some aspects, one or more repetitions of the RAR PDCCH communication 515 may be in different locations in each of the number of slots 505.

The UE 120 may attempt to receive and decode the repetitions of the PDCCH communication. The repetitions of the PDCCH communication received by the UE 120 may be combined by the UE 120. In some aspects, the repetitions that are combined by the UE 120 may be similar or identical copies of the repetitions transmitted by the base station 110. The repetitions received by the UE 120 may have slight differences due to disturbances that occur during communication of the signals that carry the repetitions.

The UE 120 may combine the number of PDCCH communication repetitions identified from monitoring a number of slots (e.g., using soft-combining). As described herein, the UE 120 may identify that a number of PDCCH communication repetitions may be combined based at least in part on information included in RAR window configuration (e.g., based at least in part on a number of repetitions, a location in each slot, a repetition level, an index, and/or the like). Based at least in part on combining the number of PDCCH communication repetitions, the UE 120 may effectively increase the received signal strength of the PDCCH communication transmissions from the base station 110. For example, the UE 120 may receive a number of partial, incomplete, or partially erroneous control information instances and, after combining, may construct a complete or near-complete PDCCH communication signal.

The UE 120 may attempt to decode the combined PDCCH communication repetitions. In some examples, the UE 120 may successfully decode the combined PDCCH communication repetitions based at least in part on constructing a complete or near-complete PDCCH communication signal from a number of PDCCH communication repetitions. The UE 120 may detect any errors in the PDCCH communication generated by combining the number of repetitions based at least in part on successfully performing a parity check. The UE 120 may identify the location (e.g., time and frequency resources) for an RAR corresponding to the random access request transmitted by the UE 120.

In some aspects, the UE 120 may identify the resource location or timing for an RAR message (e.g., a PDSCH communication carrying the RAR message) based at least in part on a communication parameter, such as a k0 parameter (e.g., indicating a timing between a downlink resource grant on a PDCCH and a downlink data transmission on a PDSCH), included in the PDCCH communication associated with the RAR. In some aspects, each repetition of the PDCCH communication may include the k0 parameter. In some aspects, the k0 parameter may indicate a timing for the RAR message based at least in part on one repetition of a plurality of repetitions transmitted by the base station 110 (e.g., the k0 parameter may indicate a timing of the RAR message from a first time associated with a first repetition of the PDCCH communication, and the base station 110 may transmit the first repetition at the first time and a second repetition at a second time).

In some wireless communication systems, one or more UEs 120 in a network may be unable to receive and/or decode multiple repetitions of the PDCCH communication associated with the RAR message. Additionally or alternatively, one or more UEs 120 may be unaware that the base station 110 is transmitting multiple repetitions of the PDCCH communication (e.g., one or more UEs 120 may be unable to receive and/or decode a random access configuration indicating that the base station 110 is transmitting multiple repetitions of the PDCCH communication). As a result, these UEs 120 may receive a repetition of the PDCCH communication and may identify the location for an RAR message based at least in part on a k0 parameter indicated by the repetition of the PDCCH communication. However, the k0 parameter may indicate a timing of the RAR message from a different repetition of the PDCCH communication (e.g., a UE 120 may only receive the second repetition at the second time, but the k0 parameter may indicate a timing for the RAR message from the first time associated with the first repetition). As a result, the UE 120 may misidentify the timing of the RAR and may not successfully receive the RAR message. This degrades network performance for these UEs 120 as the UEs 120 may not successfully receive the RAR messages from the base station 110. Additionally, this wastes control resources associated with transmitting the repetitions of the PDCCH communications to the UEs 120 that may misidentify the timing of the RAR message. Moreover, this may consume UE resources (e.g., power resources, processing resources, and/or the like) associated with attempting to receive and/or decode a PDSCH communication associated with the RAR message at a wrong time location.

Some techniques and apparatuses described herein enable alternative DMRS configuration for repetitions of an RAR PDCCH communication. For example, one or more repetitions of a PDCCH communication may include a DMRS that uses an alternative configuration (e.g., an alternative DMRS sequence, an orthogonal cover code (OCC) pattern for the DMRS, an alternative resource location for the DMRS, and/or the like). A repetition of the PDCCH communication may include a DMRS that does not use the alternative configuration. The UEs 120 that are unaware that the base station 110 is transmitting multiple repetitions of the PDCCH communication may also be unaware of the alternative configuration for the DMRSs. Therefore, those UEs 120 may not be capable of receiving the repetitions of the PDCCH communication that include a DMRS that uses the alternative configuration. A timing for a PDSCH that carries the RAR message may be based at least in part on the repetition of the PDCCH communication that includes a DMRS that does not use the alternative configuration.

As a result, the UEs 120 that are unaware that the base station 110 is transmitting multiple repetitions of the PDCCH communication may be prevented from receiving repetitions of the PDCCH communication that would result in a misidentification, by the UEs 120, of the timing of the RAR message. This improves network performance for these UEs 120 as the UEs 120 may properly identify the timing of the RAR messages and successfully receive the RAR messages from the base station 110. Additionally, this conserves control resources that would have otherwise been used transmitting the repetitions of the PDCCH communications to the UEs 120 that may misidentify the timing of the RAR message. Moreover, this conserves UE resources that would have otherwise been used attempting to receive and/or decode a PDSCH communication associated with the RAR message at a wrong time location. Furthermore, this enables the benefits of transmitting multiple repetitions of the PDCCH communication (e.g., an increase in the likelihood that a UE 120 is capable of successfully receiving the PDCCH communication, an increase in the likelihood that the UE 120 is capable of decoding the PDCCH communication to identify a location to receive the RAR message (e.g., the PDSCH communication), thereby increasing the chance for a successful random access connection, and/or the like) to be maintained while also ensuring that a chance for a successful random access connection for UEs 120 that are unaware that the base station 110 is transmitting multiple repetitions of the PDCCH communication is not decreased.

As indicated above, FIG. 5 is provided as an example. Other examples may differ from what is described with regard to FIG. 5.

Figure 6:
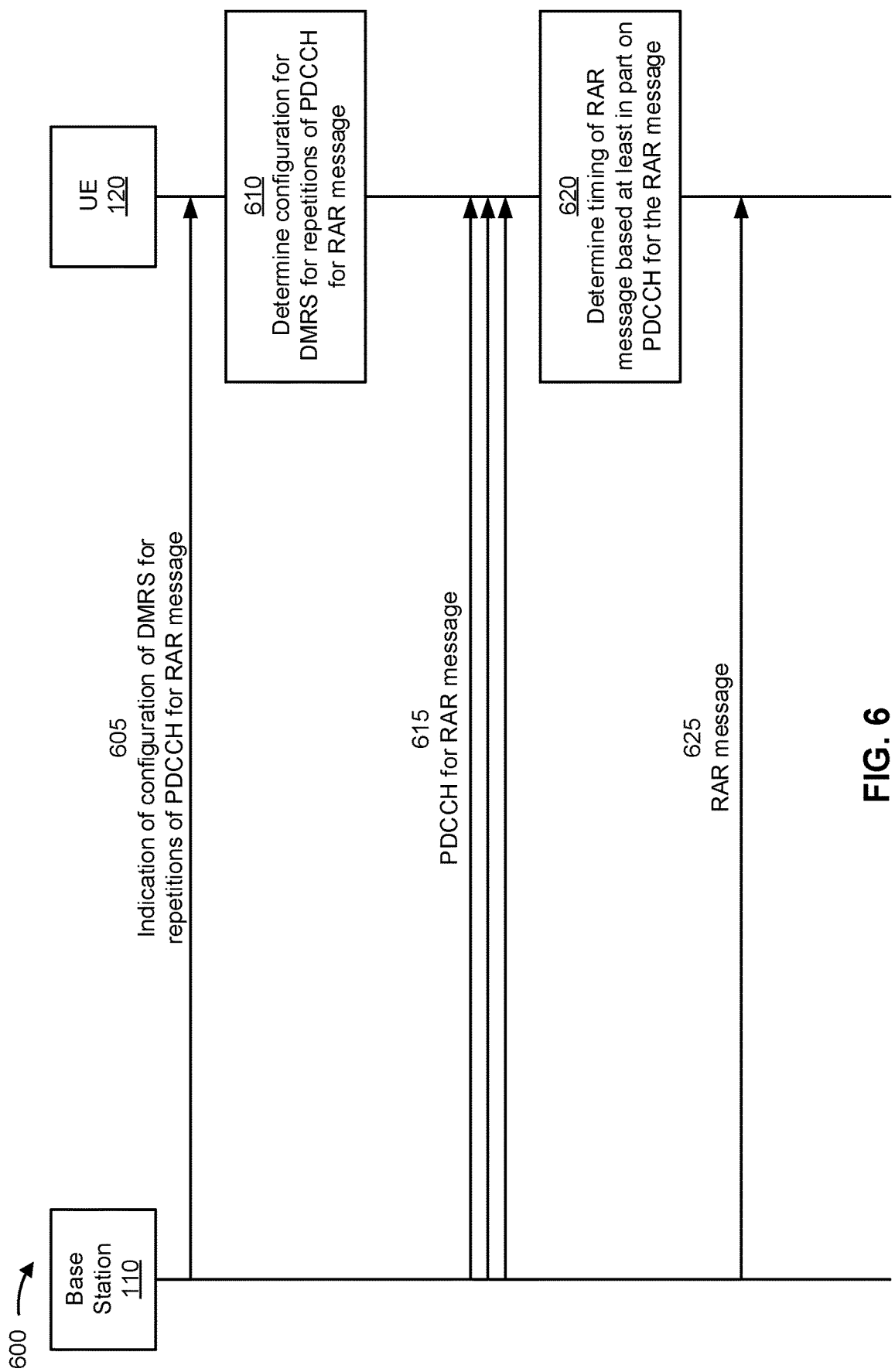
FIG. 6 is a diagram illustrating an example associated with alternative demodulation reference signal (DMRS) configuration for repetitions of an RAR PDCCH communication, in accordance with the present disclosure.

FIG. 6 is a diagram illustrating an example 600 associated with an alternative DMRS configuration for repetitions of an RAR PDCCH communication, in accordance with the present disclosure. As shown in FIG. 6, example 600 includes communication between a base station 110 and a UE 120. In some aspects, the base station 110 and the UE 120 may be included in a wireless network, such as wireless network 100. The base station 110 and UE 120 may communicate on a wireless access link, which may include an uplink and a downlink.

As shown by reference number 605, the base station 110 may transmit, and the UE 120 may receive, an indication of an alternative configuration associated with DMRSs for one or more repetitions of a PDCCH communication associated with an RAR message (e.g., that schedules the RAR message). The RAR message may be a message B of a two-step random access procedure, and/or a message 2 of a four-step random access procedure, among other examples. The alternative configuration may be an alternative DMRS sequence of the DMRSs, an OCC pattern for the DMRSs, an alternative resource location of the DMRSs, and/or the like.

The base station 110 may determine the alternative configuration to enable UEs 120 to receive the one or more repetitions of the PDCCH communication, while ensuring that UEs 120 that are unaware that the base station 110 is transmitting multiple repetitions of the PDCCH communication cannot receive the one or more repetitions of the PDCCH communication (e.g., based at least in part on the UEs 120 being unable to receive the DMRS included in the repetitions of the PDCCH communication due to the alternative configuration). In some aspects, the base station 110 may determine the alternative configuration based at least in part on a rule, such as a rule specified in a wireless communication standard (e.g., a 3GPP Technical Specification). For example, the rule may indicate the alternative configuration to be associated with the DMRS of the one or more repetitions of the PDCCH communication. In some aspects, the rule may be based at least in part on a quantity of repetitions to be transmitted by the base station 110.

In some aspects, the indication may indicate that the alternative configuration applies to DMRSs for one or more repetitions of the PDCCH communication, but does not apply to one or more other repetitions of the PDCCH communication. For example, a single repetition of the PDCCH communication may not use the alternative configuration (e.g., and may use a regular or standard DMRS configuration, such as a DMRS configuration indicated in random access configuration information, an RRC configuration). In this way, the UEs 120 that are unaware that the base station 110 is transmitting multiple repetitions of the PDCCH communication may be enabled to receive and/or decode the single repetition of the PDCCH communication that includes a DMRS that does not use the alternative configuration.

In some aspects, the indication of the alternative configuration may indicate that a timing of the RAR message is to be determined based at least in part on the single repetition of the PDCCH communication that includes a DMRS that does not use the alternative configuration. For example, the indication of the alternative configuration may indicate that the k0 parameter of the PDCCH communication is to be interpreted based at least in part on a slot in which the repetition of the PDCCH communication that includes a DMRS that does not use the alternative configuration is transmitted. In this way, UEs 120 that are aware that the base station 110 is transmitting multiple repetitions of the PDCCH communication and UEs 120 that are unaware that the base station 110 is transmitting multiple repetitions of the PDCCH communication may determine the timing of the RAR message using the same repetition of the PDCCH communication. This ensures that all UEs 120 participating in the random access procedure with the base station 110 are enabled to properly determine the timing of the RAR message, thereby increasing the likelihood that the RAR message is properly received by the UEs 120.

In some aspects, the base station 110 may determine an alternative configurable identifier that is to be used for the DMRSs of the one or more repetitions of the PDCCH communication. The alternative configurable identifier may be for initialization of the DMRS sequence and scrambling of the DMRS. In some aspects, the base station 110 may indicate the alternative configurable identifier explicitly in the indication of the alternative configuration. For example, the base station 110 may transmit a remaining minimum system information (RMSI) communication that indicates the alternative configurable identifier. In some aspects, the base station 110 may indicate the alternative configurable identifier implicitly in the indication of the alternative configuration. For example, the alternative configurable identifier may be based at least in part on a physical cell identifier associated with the base station 110. The base station 110 may indicate the physical cell identifier associated with the base station 110 (e.g., enabling the UE 120 to determine the alternative configurable identifier using the physical cell identifier based at least in part on a rule, such as a rule specified in a wireless communication standard).

In some aspects, the alternative configuration may indicate an alternative DMRS sequence to be used for the DMRSs of the one or more repetitions of the PDCCH communication. In some aspects, the alternative configuration may indicate a cyclic shift to be applied to the DMRS sequence of the DMRSs of the one or more repetitions of the PDCCH communication. In some aspects, the cyclic shift may be indicated explicitly in the indication of the alternative configuration. For example, the base station 110 may transmit an RMSI communication that indicates the cyclic shift. In some aspects, the cyclic shift may be indicated implicitly in the indication of the alternative configuration. For example, the cyclic shift may be based at least in part on a rule, such as a rule specified in a wireless communication standard. The UE 120 may determine the cyclic shift using the rule based at least in part on an indication that the base station 110 is transmitting multiple repetitions of the PDCCH communication. In some aspects, the cyclic shift may be based at least in part on the physical cell identifier associated with the base station 110. The base station 110 may indicate the physical cell identifier associated with the base station 110 (e.g., enabling the UE 120 to determine the cyclic shift based at least in part on the physical cell identifier).

In some aspects, the alternative configuration may indicate an OCC pattern for the DMRSs of the one or more repetitions of the PDCCH communication. For example, the alternative configuration may indicate an OCC pattern to be applied to the DMRS symbols of the one or more repetitions of the PDCCH communication. In some aspects, the OCC pattern may be based at least in part on a rule, such as a rule specified in a wireless communication standard.

In some aspects, the alternative configuration may indicate an alternative resource location (e.g., an alternative time domain location and/or an alternative frequency domain location) of the DMRSs of the one or more repetitions of the PDCCH communication. For example, a DMRS of a repetition of the PDCCH communication may be transmitted within one or more resource element groups (REGs). An REG may include a resource block (RB) that includes one or more resource elements (REs). A standard DMRS for the PDCCH communication may be transmitted using a first set of frequency resources within an REG (e.g., using a first set of REs). The alternative configuration may indicate that DMRSs of the one or more repetitions of the PDCCH communication are to be transmitted using a second set of frequency resources within an REG (e.g., using a second set of REs).

As shown by reference number 610, the UE 120 may determine the configuration for the DMRSs of the repetitions of the PDCCH communication. For example, the UE 120 may determine a standard configuration for DMRSs of one or more repetitions of the PDCCH communication. The UE 120 may determine the alternative configuration for DMRSs of one or more repetitions of the PDCCH communication. In some aspects, the UE 120 may determine the standard configuration for DMRSs based at least in part on a random access configuration transmitted by the base station 110, an RRC configuration transmitted by the base station 110, and/or the like.

In some aspects, the UE 120 may determine the alternative configuration for DMRSs of one or more repetitions of the PDCCH communication based at least in part on the indication of the alternative configuration for DMRSs of one or more repetitions of the PDCCH communication transmitted by the base station 110. For example, the alternative configuration may be explicitly indicated by the base station 110 (e.g., in an RMSI communication). In some aspects, the alternative configuration may be implicitly indicated by the base station 110. For example, the UE 120 may determine the alternative configuration based at least in part on the physical cell identifier associated with the base station 110, and/or a rule (e.g., a rule specified in a wireless communication standard), among other examples.

For example, the indication of the alternative configuration for DMRSs of one or more repetitions of the PDCCH communication may indicate that the base station 110 is to transmit multiple repetitions of the PDCCH communication (e.g., the indication may be a configuration for monitoring for the multiple repetitions of the PDCCH communication). The UE 120 may determine the alternative configuration for DMRSs of one or more repetitions of the PDCCH communication based at least in part on stored configuration information. The stored configuration information may be based at least in part on a configuration previously received by the UE 120, a rule specified in a wireless communication standard, and/or a pre-configured rule stored by the UE 120, among other examples.

As shown by reference number 615, the base station 110 may transmit, and the UE 120 may receive, multiple repetitions of the PDCCH communication for the RAR message (e.g., that schedules the RAR message). The base station 110 may transmit a repetition of the PDCCH communication that uses a standard configuration for a DMRS included in the repetition of the PDCCH communication (e.g., that includes a DMRS that does not use the alternative configuration). The base station 110 may transmit one or more repetitions (e.g., the remaining repetitions) of the PDCCH communication that include DMRSs that use the alternative configuration.

For example, the UE 120 may monitor a set of aggregated monitoring occasions for the repetitions of the PDCCH communication (e.g., monitoring occasions 510-*a*, 510-*b*, 510-*c*, and 510-*d* depicted in FIG. 5). The UE 120 may monitor for a repetition of the PDCCH communication in one monitoring occasion based at least in part on the standard configuration for the DMRS. The UE 120 may monitor for repetitions of the PDCCH communication in one or more other monitoring occasions based at least in part on the alternative configuration for the DMRS. The UE 120 may receive the repetitions of the PDCCH communication, during the monitoring occasions, based at least in part on monitoring for the repetitions.

In some aspects, the repetition of the PDCCH communication that includes a DMRS that does not use the alternative configuration may be transmitted during a last monitoring occasion of the set of aggregated monitoring occasions in the time domain. For example, the set of aggregated monitoring occasions may include monitoring occasions 510-*a*, 510-*b*, 510-*c*, and 510-*d* depicted in FIG. 5. The repetitions of the PDCCH communication transmitted during monitoring occasions 510-*a*, 510-*b*, and 510-*c* may include DMRSs that use the alternative configuration. The repetition of the PDCCH communication transmitted during monitoring occasion 510-*d* may include a DMRS that does not use the alternative configuration (e.g., the DMRS may use a standard configuration).

As shown by reference number 620, the UE 120 may determine the timing of the RAR message based at least in part on receiving the PDCCH communication for the RAR message. The UE 120 may determine the timing of the RAR message based at least in part on a k0 parameter indicated in control information included in the PDCCH communication. The UE 120 may interpret the k0 parameter based at least in part on the repetition of the PDCCH communication that includes a DMRS that does not use the alternative configuration. For example, the k0 parameter may indicate a timing offset for the RAR message (e.g., may indicate an amount of time from the transmission of the PDCCH communication to the transmission of the RAR message).

The UE 120 may interpret the k0 parameter from a slot during which the repetition of the PDCCH communication that includes a DMRS that does not use the alternative configuration is received. For example, as described above, the UE 120 may receive the repetition of the PDCCH communication that includes a DMRS that does not use the alternative configuration in a last monitoring occasion (e.g., monitoring occasion 510-*d*) of a set of aggregated monitoring occasions. The UE 120 may determine the timing of the RAR message using the timing offset indicated by the k0 parameter from the slot (e.g., slot 505-*d*, depicted in FIG. 5) during which the repetition of the PDCCH communication that includes a DMRS that does not use the alternative configuration is received.

As described above, all UEs 120 participating in the random access procedure with the base station 110 may be capable of receiving the repetition of the PDCCH communication that includes a DMRS that does not use the alternative configuration. Some UEs 120 (e.g., that are not aware of the alternative configuration and/or that are not aware that the base station 110 is transmitting multiple repetitions of the PDCCH communication) may not be capable of receiving and/or decoding the repetitions of the PDCCH communication that include DMRSs that do use the alternative configuration. As a result, those UEs 120 may not incorrectly use the slots during which the repetitions of the PDCCH communication that include DMRSs that do use the alternative configuration are transmitted to determine the timing of the RAR message. Therefore, all UEs 120 participating in the random access procedure with the base station 110 may determine the timing of the RAR message from the same slot, regardless of whether the UEs 120 are aware of the alternative configuration and/or are aware that the base station 110 is transmitting multiple repetitions of the PDCCH communication. This increases the likelihood that the RAR message will be successfully received by the UEs 120 participating in the random access procedure, thereby improving network performance.

As shown by reference number 625, the base station 110 may transmit, and the UE 120 may receive, the RAR message (e.g., as scheduled by the PDCCH communication). The base station 110 may transmit the RAR message in a PDSCH communication. The UE 120 may receive the RAR message based at least in part on determining the timing of the RAR message, as described above. The base station 110 and the UE 120 may proceed with the random access procedure based at least in part on the successful reception of the RAR message by the UE 120.

As a result, the UEs 120 that are unaware that the base station 110 is transmitting multiple repetitions of the PDCCH communication may be prevented from receiving repetitions of the PDCCH communication that would result in a misidentification, by the UEs 120, of the timing of the RAR. This improves network performance for these UEs 120 as the UEs 120 may properly identify the timing of the RAR messages and successfully receive the RAR messages from the base station 110. Additionally, this conserves control resources that would have otherwise been used transmitting the repetitions of the PDCCH communications to the UEs 120 that may misidentify the timing of the RAR message. Moreover, this conserves UE resources that would have otherwise been used attempting to receive and/or decode a PDSCH communication associated with the RAR message at a wrong time location. Furthermore, this enables the benefits of transmitting multiple repetitions of the PDCCH communication (e.g., an increase in the likelihood that a UE 120 is capable of successfully receiving the PDCCH communication, an increase in the likelihood that the UE 120 is capable of decoding the PDCCH communication to identify a location to receive the RAR (e.g., the PDSCH), thereby increasing the chance for a successful random access connection) to be maintained while also ensuring that a chance for a successful random access connection for UEs 120 that are unaware that the base station 110 is transmitting multiple repetitions of the PDCCH communication is not decreased.

As indicated above, FIG. 6 is provided as an example. Other examples may differ from what is described with respect to FIG. 6.

As described elsewhere herein, timing information of the random access response, in terms of number of slots after PDCCH that the corresponding PDSCH is located, is indicated by the slot offset k0, which is included in the DCI carried by the PDCCH. In examples in which PDCCH repetition is applied and a UE is not configured and/or capable of monitoring for aggregated monitoring occasions, the UE may detect one of the copies of PDCCH and then incorrectly interpret the timing of the Msg2 PDSCH. For example, the Msg2 PDCCH may be repeated over two monitoring occasions over two slots and the slot offset k0 may indicate the PDSCH timing in reference to the first copy of the PDCCH. However, the UE may detect the second copy of the PDCCH (and not the first copy of the PDCCH) and apply the slot offset k0 to the second copy of the PDCCH.

To reduce the likelihood of such occurrences, some examples may apply Msg2 PDCCH repetition in response to a subset of preambles. For example, when the base station receives a random access message (e.g., Msg1) from a UE comprising a preamble, the base station may use the preamble to determine whether the UE is capable of monitoring for aggregated monitoring occasions and determine whether to apply Msg2 PDCCH repetitions accordingly. However, such techniques may only benefit those UEs that are configured with the subset of preambles.

In some examples in which a two-segment RAR window is applied, the base station may use the first segment (or portion) of the RAR window for a first type of UEs (e.g., legacy UEs) that are incapable of monitoring for aggregated monitoring occasions and the second segment (or portion) of the RAR window for a second type of UEs that are capable of monitoring for aggregated monitoring occasions. However, segmenting the RAR window may reduce the likelihood of successful Msg2 PDCCH reception for one or both types of UEs.

In some examples, the base station may apply no extra provisions. For example, a legacy UE may use techniques to detect Msg2 PDCCH and may incorrectly interpret timing for PDSCH (e.g., due to decoding an incorrect PDCCH copy), which may result in the loss of PDSCH detection. Such techniques may reduce performance of the overall communication as a portion of control resources are used on legacy UEs that incapable of monitoring for aggregated monitoring occasions. Additionally, such techniques may result in extra power consumption by the legacy UEs as they attempt to decode the wrong PDSCH.

Some aspects disclosed herein provide techniques for improving the reliability of PDCCH by repetition. For example, the disclosed techniques enable a UE to employ blind detection to determine a number of repetitions of the PDCCH. For example, the UE may receive a random access response comprising copies of the PDCCH. The UE may use blind detection to identify a sequence that has been generated for a DMRS detected in a PDCCH copy and use the identified sequence to determine a number of repetitions of the PDCCH.

Typically, a UE may use the DMRS for the PDCCH to estimate the propagation channel experienced by the PDCCH. The resulting information may be used to demodulate the PDCCH and to subsequently decode the DCI carried by the PDCCH. The DMRS may be a pseudo-random sequence that can be initialized using either a physical cell identifier (PCI) or a scrambling identifier (e.g., pdcch-DMRS-ScramblingID) that may be provided within a CORESET. For example, the scrambling identifier may be used to initialize the pseudo-random sequence that populates the DMRS resource elements received by the UE. However, such DMRSs (sometimes referred to herein as "regular DMRSs") are not associated with PDCCH repetitions. For example, a legacy UE may be capable of detecting regular DMRSs.

Example techniques disclosed herein utilize an alternative configuration identifier that may be used to initialize an alternative DMRS. The alternative DMRS may be a DMRS that is different from regular DMRSs. In some examples, an alternative DMRS may comprise a different sequence due to, for example, a different identifier (e.g., an alternative configuration identifier) used to initialize the alternative DMRS. In some examples, the base station may provide the alternative configuration identifier to the UE. For example, the base station may include a set of alternative configuration identifiers to the UE via a remaining minimum system information (RMSI) message. In some examples, the UE may determine the set of alternative configuration identifiers based on one or more of a PCI, a configured rule, and/or one or more parameters provided by the base station (e.g., via an RMSI message).

In some examples, the alternative DMRS may be detected by applying a cover code (or alternative cover code) of +1 and/or −1. For example, a configured set of orthogonal cover codes may be applied to the DMRS symbols for the copies of the PDCCH. In some examples, the alternative DMRS may be detected by applying different cyclic shifts. For example, the different cyclic shifts may depend on a physical cell identifier. In some examples, the configured set of orthogonal cover codes and/or cyclic shifts may be configured (e.g., via RRC signaling) and/or may be provided by the base station (e.g., via an RMSI message).

In some examples, when the UE detects an alternative DMRS, the UE may determine the number of repetitions of Msg2 PDCCH based on the detected alternative DMRS. For example, each alternative configuration identifier of the set of alternative configuration identifiers may correspond to a respective number of repetitions. For example, if there are three different repetition configurations available for Msg2 PDCCH repetitions (e.g., 2 repetitions, 4 repetitions, or 8 repetitions), the set of alternative configuration identifiers may comprise three different alternative configuration identifiers, three different cover codes, or three different cyclic shifts. Thus, by first identifying an alternative DMRS, the UE may use the detected alternative DMRS to determine the number of repetitions of Msg2 PDCCH. The UE may then apply blind detection on the aggregated monitoring occasions based on the number of repetitions associated with the detected alternative DMRS and/or the sequence.

Figure 7:
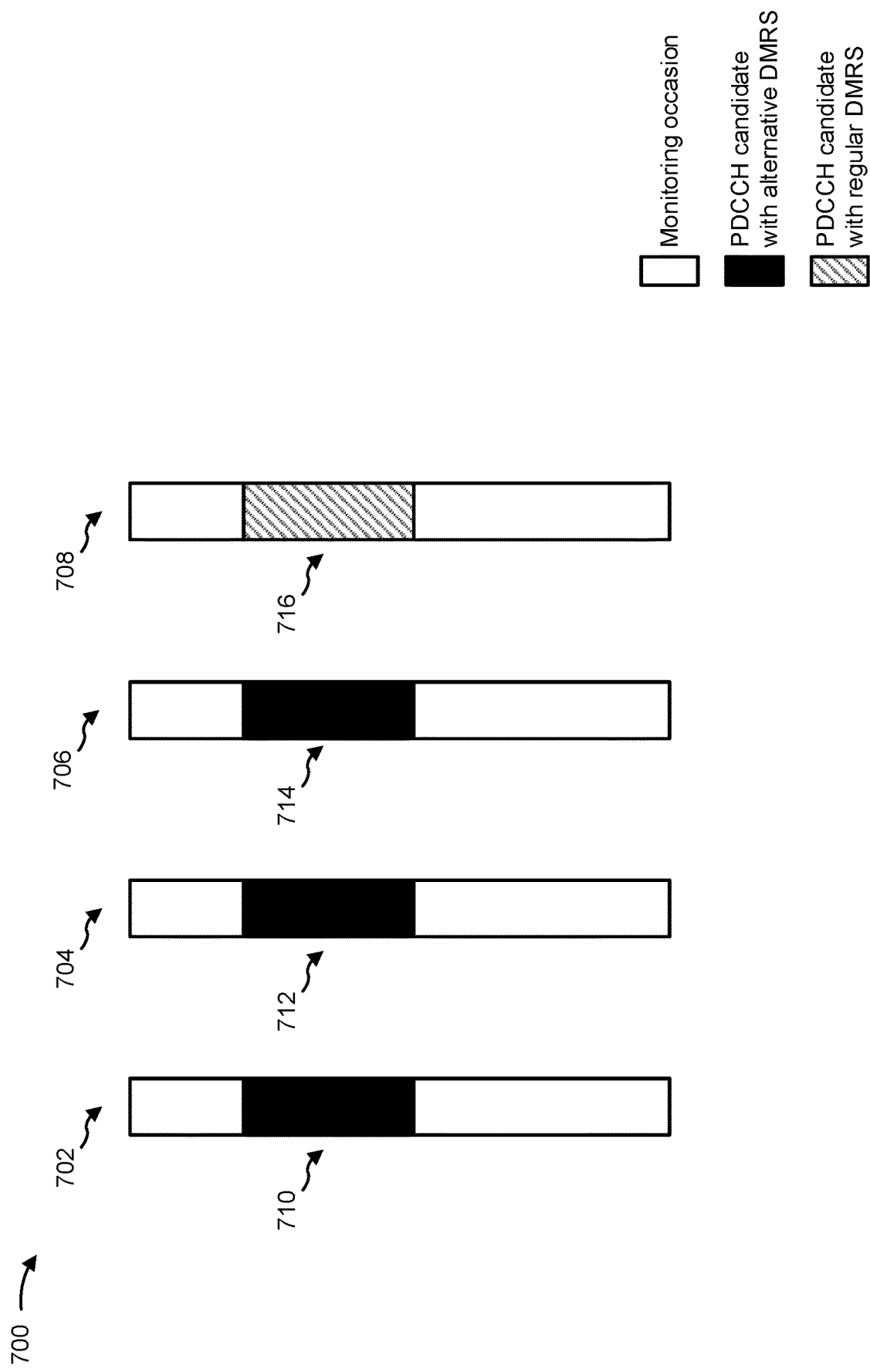
FIG. 7 is a diagram illustrating a sequence of a plurality of monitoring occasions including copies of PDCCH candidates with an alternative DMRS and a regular DMRS, in accordance with the present disclosure.

FIG. 7 is a diagram illustrating a sequence 700 of a plurality of monitoring occasions 702, 704, 706, 708 including copies of PDCCH candidates with an alternative DMRS and a regular DMRS, in accordance with the present disclosure. Aspects of the monitoring occasions 702, 704, 706, 708 may correspond to the respective occasions 510a, 510b, 510c, 510d of FIG. 5. In the illustrated example, each of the monitoring occasions 702, 704, 706, 708 may be combined to form an aggregated monitoring occasion.

As shown in FIG. 7, each of the monitoring occasions 702, 704, 706, 708 include a PDCCH candidate. For example, a first monitoring occasion 702 includes a first PDCCH candidate 710, a second monitoring occasion 704 includes a second PDCCH candidate 712, a third monitoring occasion 706 includes a third PDCCH candidate 714, and a fourth monitoring occasion 708 includes a fourth PDCCH candidate 716. Each of the PDCCH candidates 710, 712, 714, 716 are copies and, thus, comprise a same allocation of symbols. In particular, each of the PDCCH candidates 710, 712, 714, 716 may comprise the same control data.

As shown in FIG. 7, the first three PDCCH candidates 710, 712, 714 include an alternative DMRS and the fourth PDCCH candidate 716 includes a regular DMRS. For example, the first three PDCCH candidates 710, 712, 714 may include alternative DMRSs that are initialized using an alternative configuration identifier, and/or determined based on a configured orthogonal cover code and/or a configured cyclic shift.

The UE may receive the first PDCCH candidate 710 and determine whether the first PDCCH candidate 710 includes an alternative DMRS or a regular DMRS. If the UE determines that the first PDCCH candidate 710 comprises an alternative DMRS (e.g., based on an alternative configuration identifier, configured orthogonal cover code, and/or configured cycle shift), then the UE may determine that there are repetitions of the PDCCH candidate 710 and may use the alternative DMRS to determine the number of repetitions. For example, in the illustrated example of FIG. 7, the UE may determine, based on the alternative DMRS included in the first PDCCH candidate 710, that there are four copies (e.g., four repetitions) of Msg2 PDCCH (e.g., the PDCCH candidates 710, 712, 714, 716).

In some examples, the UE may also be able to determine a sequence of the DMRSs based on the detected alternative DMRS. For example, in the example of FIG. 7, the UE may determine that the first three PDCCH candidates 710, 712, 714 include an alternative DMRS and that the fourth PDCCH candidate 716 includes a regular DMRS. As described above, regular DMRSs may be detected by legacy UEs.

In some examples, after the UE determines the configuration of the DMRS of the PDCCH candidates 710, 712, 714, 716, the UE may use the DMRS to perform channel estimation. The UE may then combine the control data (or symbols) from the four copies (e.g., the PDCCH candidates 710, 712, 714, 716) to provide a signal boost and to facilitate decoding of control information for the Msg2 PDSCH (e.g., the random access response) corresponding to the PDCCH candidates 710, 712, 714, 716. For example, while the DMRS of the fourth PDCCH candidate 716 may be different than the first three PDCCH candidates 710, 712, 714, the control symbols are the same. Thus, if each PDCCH candidate 710, 712, 714, 716 contains four control symbols, the UE may use the combined total of 16 control symbols for decoding the control information for the Msg2 PDSCH.

As described above, a legacy UE may be unable to detect the alternative DMRS. Accordingly, the legacy UE may attempt to perform channel estimating using the regular DMRS of the fourth PDCCH candidate 716 and perform blind detection using the fourth PDCCH candidate 716 to determine the control information for the Msg2 PDSCH.

As shown in FIG. 7, the regular DMRS is contained within the last PDCCH candidate 716. Additionally, the slot offset k0 may be interpreted based on the slot containing the regular DMRS. For example, the timing information associated with the location of the Msg2 PDSCH may be based on the fourth PDCCH candidate 716 of FIG. 7 (e.g., as described elsewhere herein, such as in connection with FIG. 6). In some examples, the PDCCH candidate containing the regular DMRS may be associated with the last aggregated slot and/or last monitoring occasion of the aggregated monitoring occasion.

As indicated above, FIG. 7 is provided as an example. Other examples may differ from what is described with respect to FIG. 7.

Figure 8:
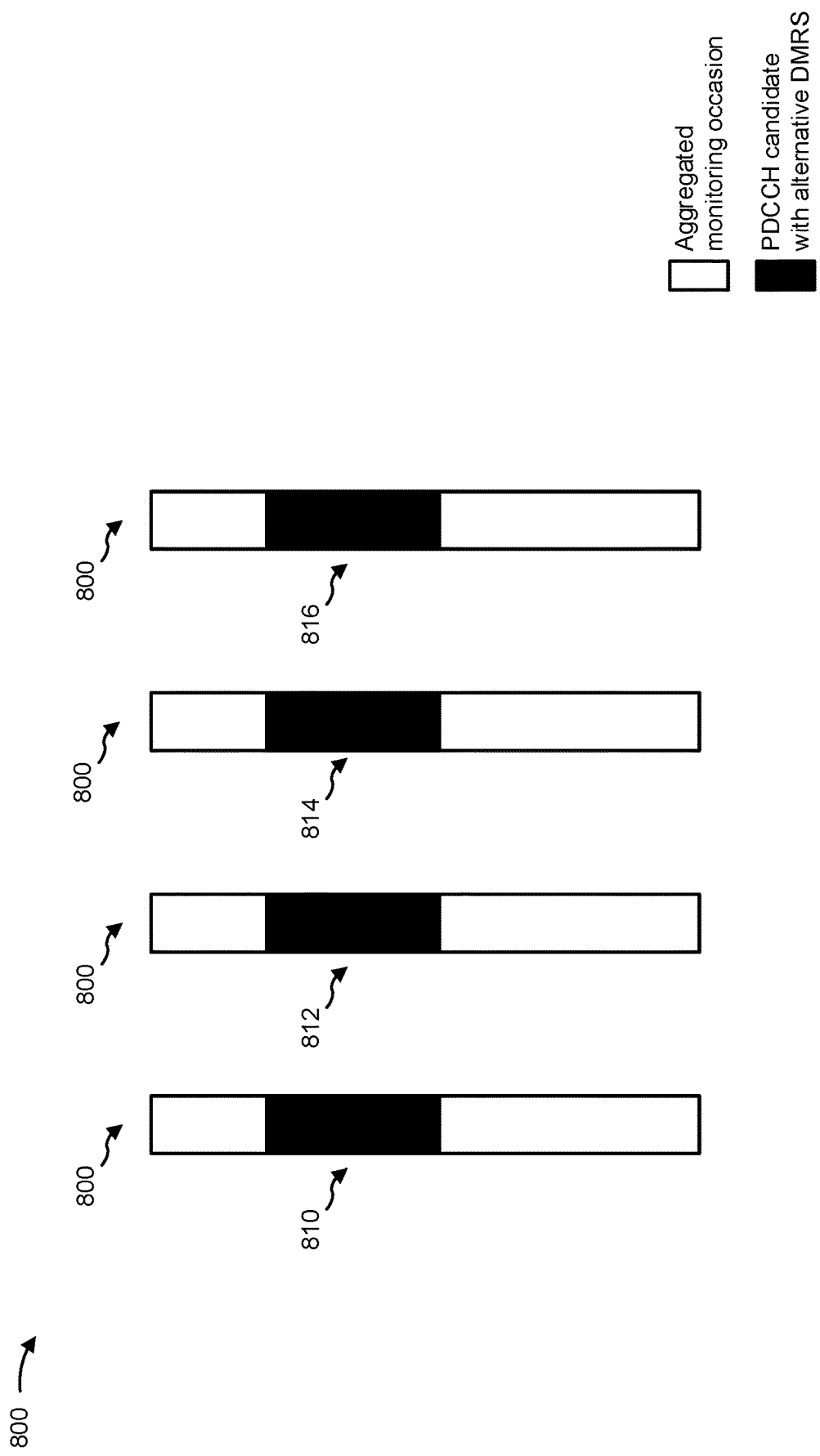
FIG. 8 is a diagram illustrating a sequence of a plurality of monitoring occasions including copies of PDCCH candidates with an alternative DMRS, in accordance with the present disclosure.

FIG. 8 is a diagram illustrating a sequence 800 of a plurality of monitoring occasions 802, 804, 806, 808 including copies of PDCCH candidates with an alternative DMRS, in accordance with the present disclosure. Aspects of the monitoring occasions 802, 804, 806, 808 may correspond to the respective occasions 510a, 510b, 510c, 510d of FIG. 5. In the illustrated example, each of the monitoring occasions 802, 804, 806, 808 may be combined to form an aggregated monitoring occasion.

Similar to the example of FIG. 7, each of the monitoring occasions 802, 804, 806, 808 may include a corresponding PDCCH candidate 810, 812, 814, 816. In the illustrated example of FIG. 8, each of the PDCCH candidates 810, 812, 814, 816 may include alternative DMRS. Unlike the example of FIG. 7, a legacy UE may be unable to detect the alternative DMRS in the PDCCH candidates 810, 812, 814, 816, and, thus, may be unable to determine the correct timing information for Msg2 PDSCH associated with the PDCCH candidates 810, 812, 814, 816 of FIG. 8.

As indicated above, FIG. 8 is provided as an example. Other examples may differ from what is described with respect to FIG. 8.

Figure 9:
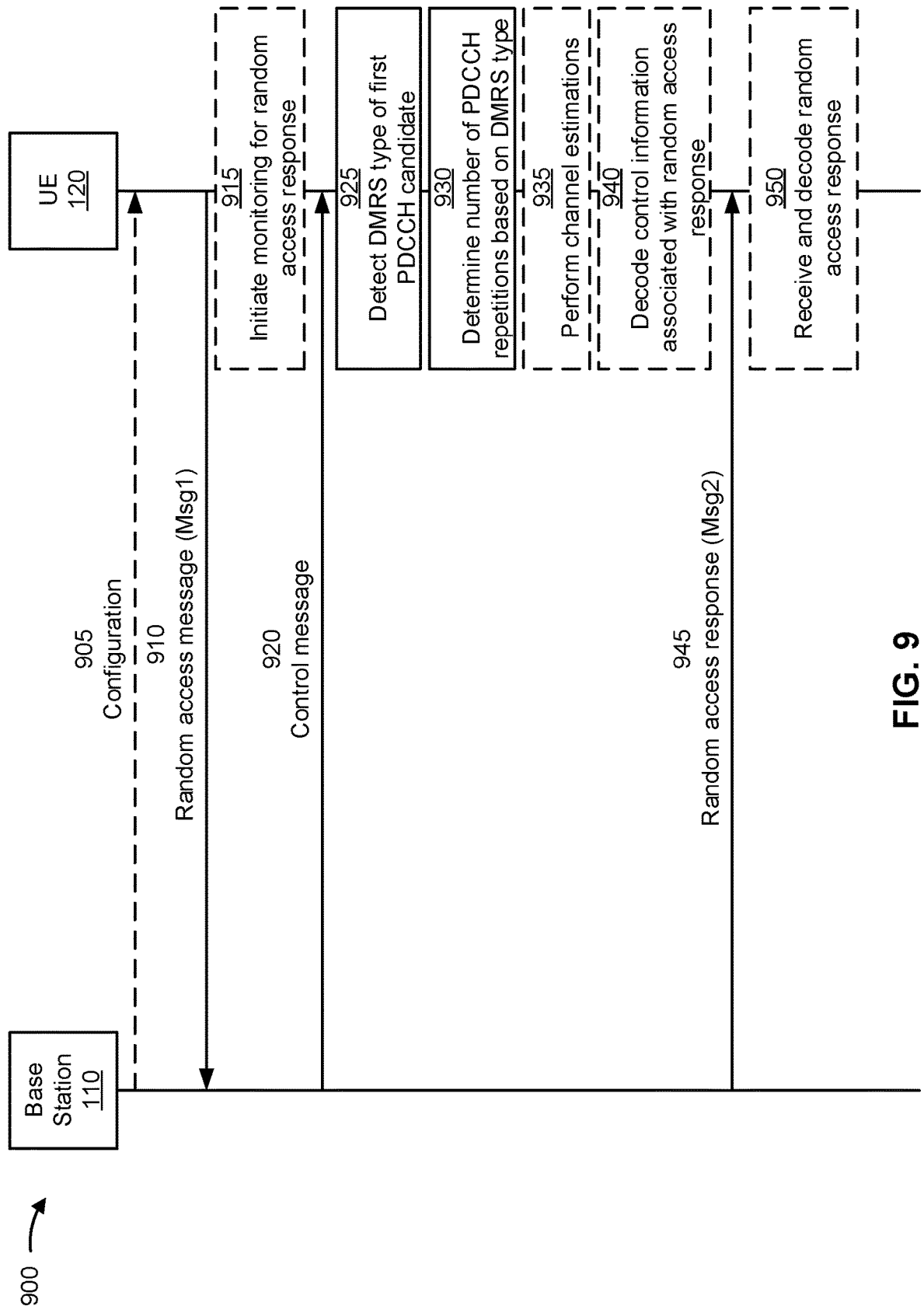
FIG. 9 is a diagram illustrating an example associated with blind detection of an RAR PDCCH repetition number via DMRS, in accordance with the present disclosure.

FIG. 9 is a diagram illustrating an example 900 associated with blind detection of an RAR PDCCH repetition number via DMRS, in accordance with the present disclosure. As shown in FIG. 9, example 900 includes communication between a base station 110 and a UE 120. In some aspects, the base station 110 and the UE 120 may be included in a wireless network, such as wireless network 100. The base station 110 and UE 120 may communicate on a wireless access link, which may include an uplink and a downlink.

In some examples, as shown by reference number 905, the base station 110 may transmit a configuration that is received by the UE 120. In some examples, the configuration may contain a random access preamble assignment (e.g., for performing a contention-free random access procedure). In some examples, the configuration may include an RMSI message. In some examples, the configuration may include a set of alternative configuration identifiers that may include alternative identifiers for initializing an alternative DMRS. In some examples, the set of alternative configuration identifiers may comprise a set of orthogonal cover codes and/or a set of cyclic shifts. In some examples, each of the alternative configuration identifiers may correspond to a respective number of repetitions of Msg2 PDCCH and/or a sequence. The base station 110 may transmit the configuration via RRC signaling.

As shown by reference number 910, the UE 120 may transmit a random access message that is received by the base station 110. The random access message (e.g., a Msg1 or MsgA) may include a preamble. In some examples, as shown by reference number 915, the UE 120 may initiate monitoring for a random access response (e.g., Msg2 or MsgB) from the base station 110 after transmitting the random access message. In some examples, if the UE 120 does not receive a random access response within a threshold period after initiating monitoring, the UE 120 may transmit another random access message including another preamble.

As shown by reference number 920, the base station 110 may transmit a control message that is received by the UE 120. The control message may include a sequence of slots containing control information for a random access response (e.g., Msg2 or MsgB). The control message may contain PDCCH repetitions. For example, the control message may contain a configured number of PDCCH candidates that are copies (e.g., include a same allocation of symbols and same control data). To facilitate the determination of the number of PDCCH repetitions, the base station 110 may transmit an alternative DMRS in at least a first PDCCH candidate, as described in more detail elsewhere herein. In some examples, the base station 110 may include a regular DMRS in the control message. For example, the base station 110 may include a regular DMRS in the last PDCCH candidate of the set of PDCCH candidates, as described in more detail elsewhere herein, such as in connection with FIG. 7.

After receiving the control message, the UE 120 may attempt to decode the control information to facilitate receiving and decoding the corresponding random access response. For example, as shown by reference number 925, the UE 120 may detect a DMRS type of the first PDCCH candidate. For example, the UE 120 may attempt to determine whether the DMRS of the first PDCCH candidate is a regular DMRS or an alternative DMRS.

As shown by reference number 930, the UE 120 may determine a number of PDCCH repetitions based on the DMRS type. For example, after determining that the DMRS of the first PDCCH candidate is an alternative DMRS, the UE 120 may determine the alternative configuration identifier and map the determined alternative configuration identifier to a number of PDCCH repetitions. In some examples, the UE 120 may additionally, or alternatively, determine a sequence of an alternative DMRS and/or regular DMRS based on the alternative configuration identifier.

As shown by reference number 935, the UE 120 may perform channel estimations on the DMRS detected in the control message. For example, if the control message includes four PDCCH candidates, the UE 120 may perform channel estimations on each of the four corresponding DMRSs.

As shown by reference number 940, the UE 120 may decode control information associated with the random access response. For example, the UE 120 may use the number of PDCCH repetitions to determine what symbols to combine. The UE 120 may also check cyclic redundancy checks (CRCs) on the combined symbols.

As shown by reference number 945, the base station 110 may transmit a random access response that is received by the UE 120. As shown by reference number 950, the UE 120 may use the control information (e.g., decoded as described above) to receive and decode the random access response. For example, the control information may include timing information and/or a slot offset k0 indicating a location of a Msg2 or MsgB PDSCH corresponding to the random access response.

Although the above example illustrates the control message and the random access response transmitted as separate messages, the messages may be transmitted in a combined message. Additionally, in some examples, the UE 120 may receive the control message and the random access response before detecting the DMRS type of the first PDCCH candidate.

As indicated above, FIG. 9 is provided as an example. Other examples may differ from what is described with respect to FIG. 9.

Figure 10:
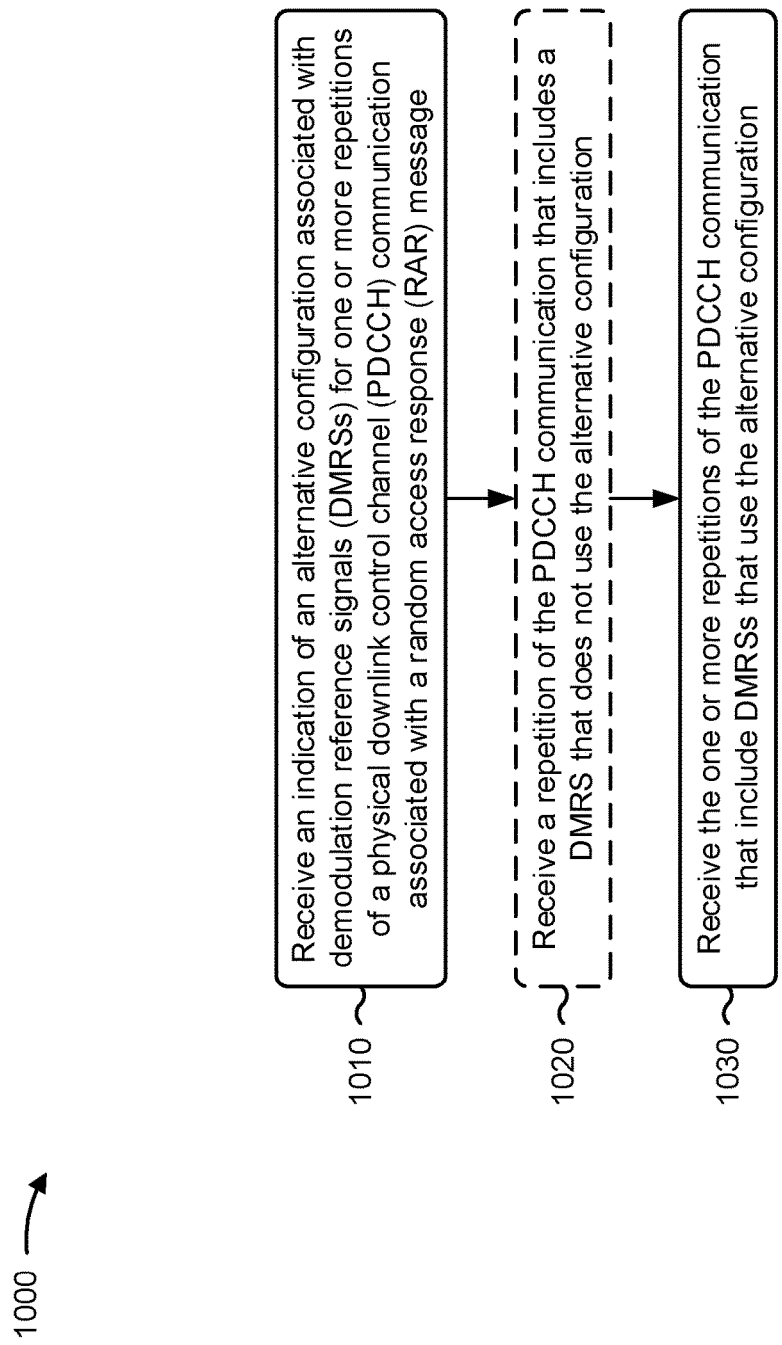
FIGS. 10-13 are diagrams illustrating example processes associated with an alternative DMRS configuration for repetitions of an RAR PDCCH communication, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with an alternative DMRS configuration for repetitions of an RAR PDCCH communication.

As shown in FIG. 10, in some aspects, process 1000 may include receiving an indication of an alternative configuration associated with DMRSs for one or more repetitions of a PDCCH communication associated with an RAR message (block 1010). For example, the UE (e.g., using antenna 252, demodulator 254, MIMO detector 256, receive processor 258, controller/processor 280, and/or memory 282) may receive an indication of an alternative configuration associated with DMRSs for one or more repetitions of a PDCCH communication associated with an RAR message, as described above in connection with FIGS. 6-9. In some aspects, the alternative configuration is at least one of an alternative DMRS sequence of the DMRSs, an orthogonal cover code pattern for the DMRSs, or an alternative resource location of the DMRSs.

In some aspects, receiving the indication of the alternative configuration associated with DMRSs for one or more repetitions of the PDCCH communication associated with the RAR message comprises receiving a remaining minimum system information (RMSI) communication indicating the alternative configuration. In some aspects, receiving the RMSI communication indicating the alternative configuration comprises receiving the RMSI communication indicating a cyclic shift to be applied to a DMRS sequence of the DMRSs for one or more repetitions of the PDCCH communication.

In some aspects, receiving the indication of the alternative configuration associated with DMRSs for the one or more repetitions of the PDCCH communication associated with the RAR message comprises receiving an indication of a cell identifier associated with a base station that is transmitting the one or more repetitions of the PDCCH communication, and determining the alternative configuration based at least in part on the cell identifier. In some aspects, determining the alternative configuration based at least in part on the cell identifier comprises determining a cyclic shift to be applied to a DMRS sequence of the DMRSs for the one or more repetitions of the PDCCH communication based at least in part on the cell identifier.

In some aspects, receiving the indication of the alternative configuration associated with DMRSs for the one or more repetitions of the PDCCH communication associated with the RAR message comprises receiving a configuration for monitoring for a plurality of repetitions of the PDCCH communication associated with the RAR message, and determining, based at least in part on a stored configuration, the alternative configuration associated with DMRSs for the one or more repetitions, of the plurality of repetitions, of the PDCCH communication.

As further shown in FIG. 10, in some aspects, process 1000 may optionally include receiving a repetition of the PDCCH communication that includes a DMRS that does not use the alternative configuration (block 1020). For example, the UE (e.g., using antenna 252, demodulator 254, MIMO detector 256, receive processor 258, controller/processor 280, and/or memory 282) may receive a repetition of the PDCCH communication that includes a DMRS that does not use the alternative configuration, as described above in connection with FIGS. 6-9. In some aspects, receiving the repetition of the PDCCH communication that includes the DMRS that does not use the alternative configuration comprises receiving the repetition of the PDCCH communication that includes the DMRS that does not use the alternative configuration in a last monitoring occasion of a set of aggregated monitoring occasions associated with repetitions of the PDCCH communication.

As further shown in FIG. 10, in some aspects, process 1000 may include receiving the one or more repetitions of the PDCCH communication that include DMRSs that use the alternative configuration (block 1030). For example, the UE (e.g., using antenna 252, demodulator 254, MIMO detector 256, receive processor 258, controller/processor 280, and/or memory 282) may receive the one or more repetitions of the PDCCH communication that include DMRSs that use the alternative configuration, as described above in connection with FIGS. 6-9.

Process 1000 may include additional aspects, such as any single aspect or any combination of aspects described below and/or in connection with one or more other processes described elsewhere herein.

In some aspects, the RAR message is a message 2 of a random access procedure.

In some aspects, process 1000 includes determining a timing of a physical downlink shared channel communication associated with the RAR message based at least in part on a slot in which the repetition of the PDCCH communication that includes the DMRS that does not use the alternative configuration is received.

In some aspects, receiving the repetition of the PDCCH communication that includes the DMRS that does not use the alternative configuration comprises receiving the DMRS of the repetition of the PDCCH communication in a first resource location, and receiving the one or more repetitions of the PDCCH communication that include DMRSs that use the alternative configuration comprises receiving the DMRSs of the one or more repetitions of the PDCCH communication in a second resource location.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
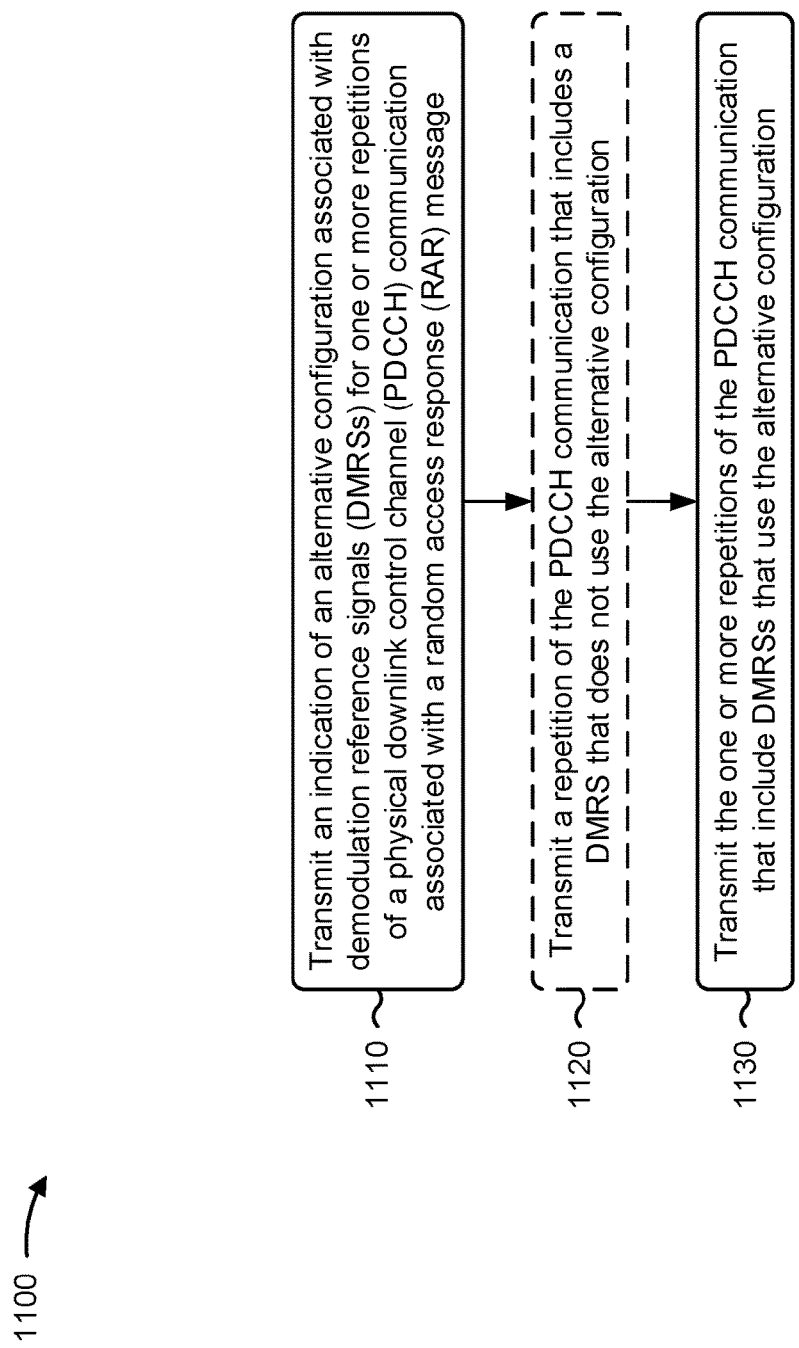

FIG. 11 is a diagram illustrating an example process 1100 performed, for example, by a base station, in accordance with the present disclosure. Example process 1100 is an example where the base station (e.g., base station 110) performs operations associated with an alternative DMRS configuration for repetitions of an RAR PDCCH communication.

As shown in FIG. 11, in some aspects, process 1100 may include transmitting an indication of an alternative configuration associated with DMRSs for one or more repetitions of a PDCCH communication associated with an RAR message (block 1110). For example, the base station (e.g., using transmit processor 220, TX MIMO processor 230, modulator 232, antenna 234, controller/processor 240, memory 242, and/or scheduler 246) may transmit an indication of an alternative configuration associated with DMRSs for one or more repetitions of a PDCCH communication associated with an RAR message, as described above in connection with FIGS. 6-9. In some aspects, the alternative configuration is at least one of an alternative DMRS sequence of the DMRSs, an orthogonal cover code pattern for the DMRSs, or an alternative resource location of the DMRSs.

In some aspects, transmitting the indication of the alternative configuration associated with DMRSs for one or more repetitions of the PDCCH communication associated with the RAR message comprises transmitting an RMSI communication indicating the alternative configuration. In some aspects, transmitting the RMSI communication indicating the alternative configuration comprises transmitting the RMSI communication indicating a cyclic shift to be applied to a DMRS sequence of the DMRSs for one or more repetitions of the PDCCH communication.

In some aspects, transmitting the indication of the alternative configuration associated with DMRSs for the one or more repetitions of the PDCCH communication associated with the RAR message comprises transmitting an indication of a cell identifier associated with the base station.

In some aspects, transmitting the indication of the alternative configuration associated with DMRSs for the one or more repetitions of the PDCCH communication associated with the RAR message comprises transmitting a configuration for one or more UEs for monitoring for a plurality of repetitions of the PDCCH communication associated with the RAR message.

As further shown in FIG. 11, in some aspects, process 1100 may optionally include transmitting a repetition of the PDCCH communication that includes a DMRS that does not use the alternative configuration (block 1120). For example, the base station (e.g., using transmit processor 220, TX MIMO processor 230, modulator 232, antenna 234, controller/processor 240, memory 242, and/or scheduler 246) may transmit a repetition of the PDCCH communication that includes a DMRS that does not use the alternative configuration, as described above in connection with FIGS. 6-9. In some aspects, transmitting the repetition of the PDCCH communication that includes the DMRS that does not use the alternative configuration comprises transmitting the repetition of the PDCCH communication that includes the DMRS that does not use the alternative configuration in a last monitoring occasion of a set of aggregated monitoring occasions associated with repetitions of the PDCCH communication.

As further shown in FIG. 11, in some aspects, process 1100 may include transmitting the one or more repetitions of the PDCCH communication that include DMRSs that use the alternative configuration (block 1130). For example, the base station (e.g., using transmit processor 220, TX MIMO processor 230, modulator 232, antenna 234, controller/processor 240, memory 242, and/or scheduler 246) may transmit the one or more repetitions of the PDCCH communication that include DMRSs that use the alternative configuration, as described above in connection with FIGS. 6-9.

Process 1100 may include additional aspects, such as any single aspect or any combination of aspects described below and/or in connection with one or more other processes described elsewhere herein.

In some aspects, the RAR message is a message 2 of a random access procedure.

In some aspects, transmitting the repetition of the PDCCH communication that includes the DMRS that does not use the alternative configuration comprises transmitting the DMRS of the repetition of the PDCCH communication in a first resource location, and transmitting the one or more repetitions of the PDCCH communication that include DMRSs that use the alternative configuration comprises transmitting the DMRSs of the one or more repetitions of the PDCCH communication in a second resource location.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
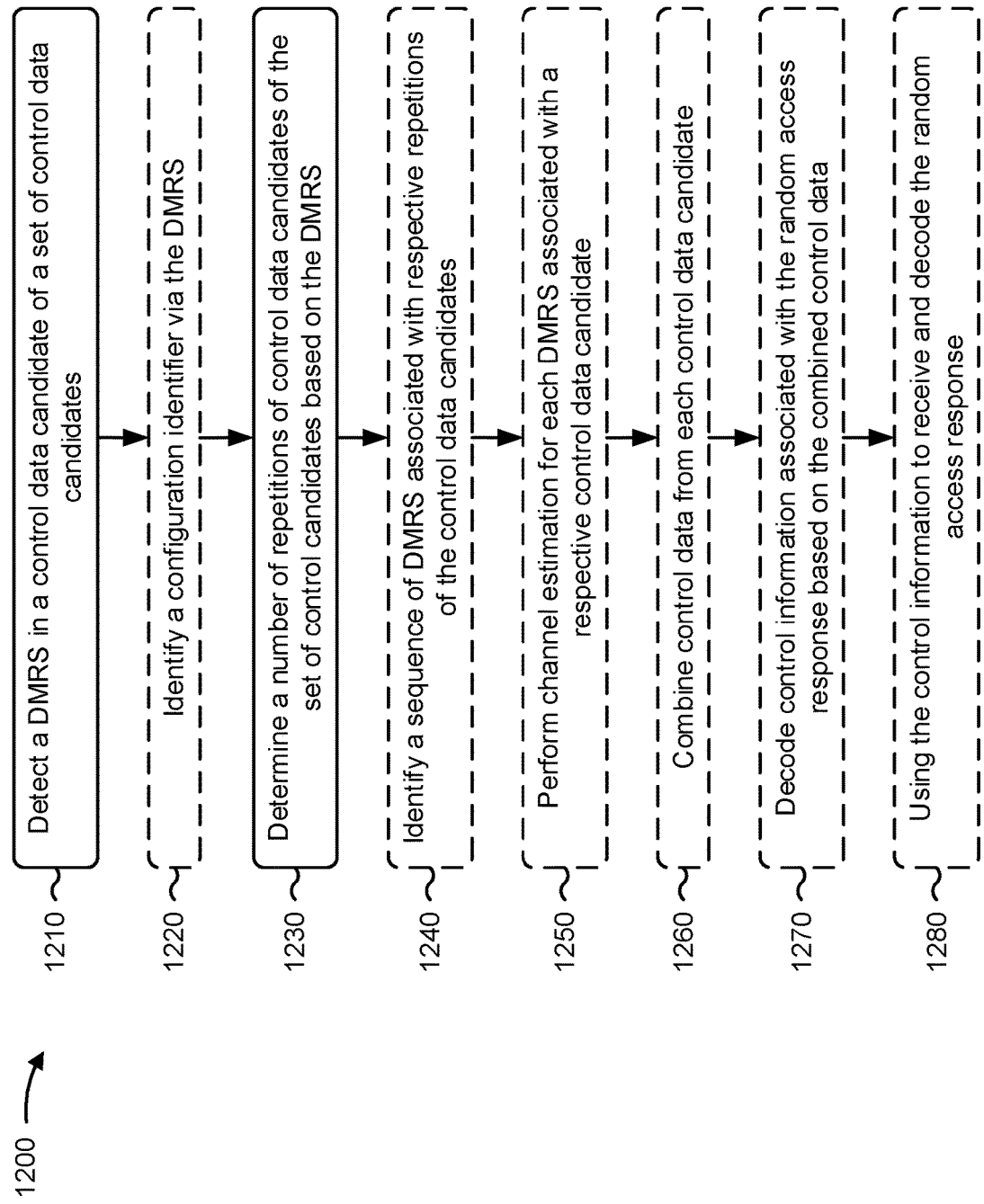

FIG. 12 is a diagram illustrating an example process 1200 performed, for example, by a UE, in accordance with the present disclosure. Optional aspects are illustrated with a dashed line. Example process 1200 is an example where the UE (e.g., UE 120) performs operations associated with blind detection of an RAR PDCCH repetition number via DMRS.

As shown in FIG. 12, in some aspects, process 1200 may include detecting a DMRS in a control data candidate of a set of control data candidates received while monitoring for a random access response from a base station (block 1210). For example, the UE (e.g., using antenna 252, demodulator 254, MIMO detector 256, receive processor 258, controller/processor 280, and/or memory 282) may detect a DMRS in a control data candidate of a set of control data candidates received while monitoring for a random access response from a base station, as described above in connection with FIGS. 6-9.

As shown in FIG. 12, in some aspects, process 1200 may include identifying a configuration identifier via the DMRS (block 1220). For example, the UE (e.g., using antenna 252, demodulator 254, MIMO detector 256, receive processor 258, controller/processor 280, and/or memory 282) may identify a configuration identifier via the DMRS, as described above in connection with FIGS. 6-9. In some aspects, the configuration identifier may correspond to a number of repetitions of the control data candidates.

In some aspects, the configuration identifier may be indicated via an RMSI message. In some aspects, the UE may determine the configuration identifier based on at least one of a physical cell identifier, a configured rule, or one or more parameters indicated in an RMSI message. In some aspects, the configuration identifier may be based on a set of cyclic shifts. In such examples, each cyclic shift of the set of cyclic shifts may correspond to a respective number of repetitions of the control data candidates. In some aspects, the set of cyclic shifts may be indicated via an RMSI message, may be configured via RRC signaling, and/or may be based on a physical cell identifier. In some aspects, the UE may determine the configuration identifier by applying a set of orthogonal cover codes to a DMRS in the control data candidate. For example, the set of orthogonal cover codes may be configured for control data.

As shown in FIG. 12, in some aspects, process 1200 may include determining a number of repetitions of control data candidates of the set of control data candidates based on the DMRS (block 1230). For example, the UE (e.g., using antenna 252, demodulator 254, MIMO detector 256, receive processor 258, controller/processor 280, and/or memory 282) may determine a number of repetitions of control data candidates of the set of control data candidates based on the DMRS, as described above in connection with FIGS. 6-9.

As shown in FIG. 12, in some aspects, process 1200 may include identifying a sequence of DMRS associated with respective repetitions of the control data candidates (block 1240). For example, the UE (e.g., using antenna 252, demodulator 254, MIMO detector 256, receive processor 258, controller/processor 280, and/or memory 282) may identify a sequence of DMRS associated with respective repetitions of the control data candidates, as described above in connection with FIGS. 6-9.

In some aspects, the sequence of DMRS may include one or more repetitions of the DMRS and a DMRS for a random access message without repetition, as described in connection with the FIGS. 6-9. In such examples, the DMRS for the random access message without repetition may be initialized via a configurable identifier, such as a primary cell identifier. In some aspects, the DMRS for the random access message without repetition may be included in a last control data candidate of the set of control data candidates. In some aspects, a location of the last control data candidate may correspond to a k0 slot offset.

In some aspects, the sequence of DMRS may include one or more repetitions of the DMRS. In such examples, the sequence of DMRS may not include a DMRS for the random access message without repetition. In such examples, a legacy UE may be unable to detect the sequence of DMRS.

As shown in FIG. 12, in some aspects, process 1200 may include performing channel estimation for each DMRS associated with a respective control data candidate of the set of control data candidates (block 1250). For example, the UE (e.g., using antenna 252, demodulator 254, MIMO detector 256, receive processor 258, controller/processor 280, and/or memory 282) may perform channel estimation for each DMRS associated with a respective control data candidate of the set of control data candidates, as described above in connection with FIGS. 6-9.

As shown in FIG. 12, in some aspects, process 1200 may include combining control data from each control data candidate (block 1260). For example, the UE (e.g., using antenna 252, demodulator 254, MIMO detector 256, receive processor 258, controller/processor 280, and/or memory 282) may combine control data from each control data candidate, as described above in connection with FIGS. 6-9.

As shown in FIG. 12, in some aspects, process 1200 may include decoding control information associated with the random access response based on the combined control data (block 1270). For example, the UE (e.g., using antenna 252, demodulator 254, MIMO detector 256, receive processor 258, controller/processor 280, and/or memory 282) may decode control information associated with the random access response based on the combined control data, as described above in connection with FIGS. 6-9.

As shown in FIG. 12, in some aspects, process 1200 may include using the control information to receive and decode the random access response (block 1280). For example, the UE (e.g., using antenna 252, demodulator 254, MIMO detector 256, receive processor 258, controller/processor 280, and/or memory 282) may use the control information to receive and decode the random access response, as described above in connection with FIGS. 6-9.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
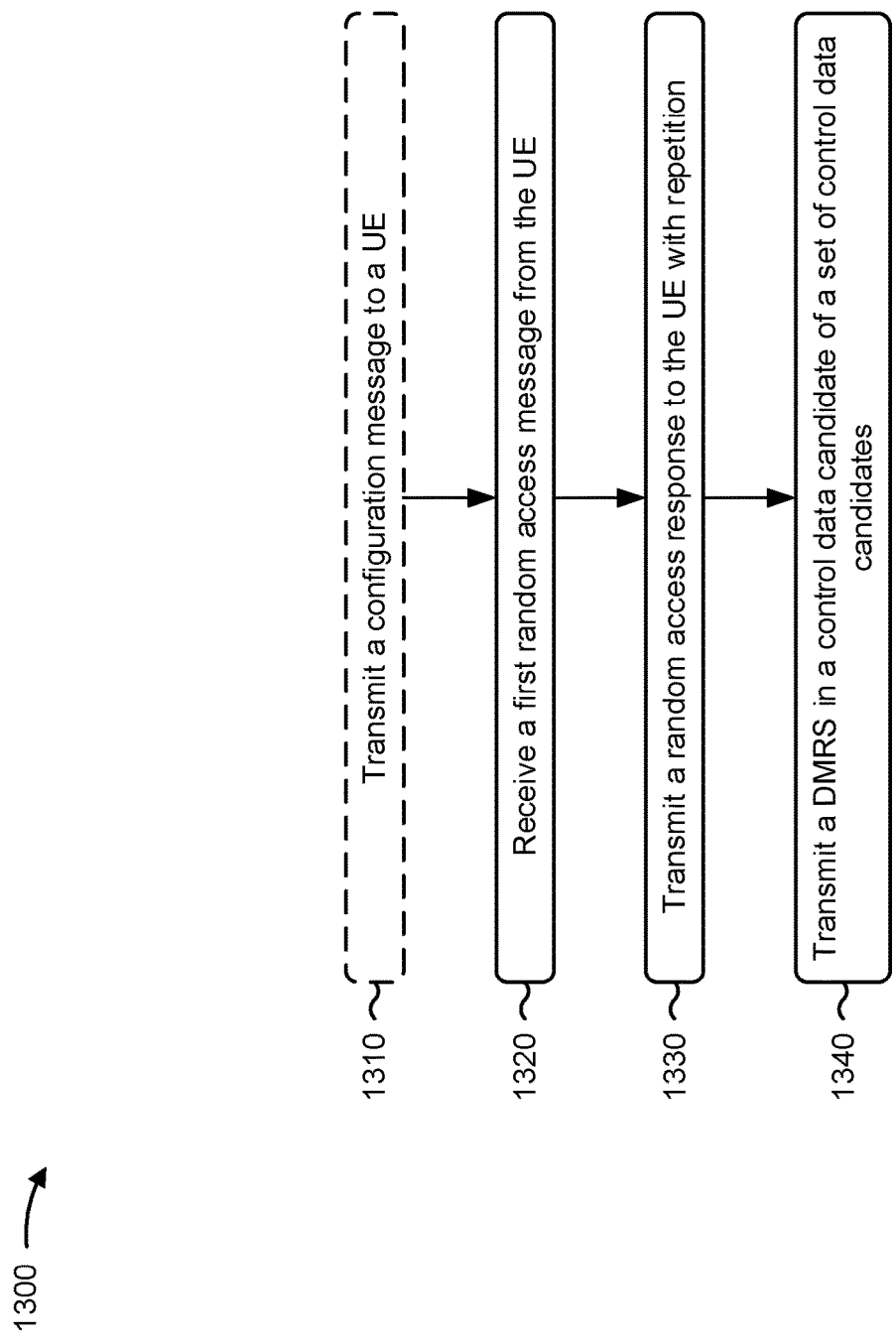

FIG. 13 is a diagram illustrating an example process 1300 performed, for example, by a base station, in accordance with the present disclosure. Example process 1300 is an example where the base station (e.g., base station 110) performs operations associated with blind detection of an RAR PDCCH repetition number via DMRS.

As shown in FIG. 13, in some aspects, process 1100 may include transmitting a configuration message to a UE (block 1310). For example, the base station (e.g., using transmit processor 220, TX MIMO processor 230, modulator 232, antenna 234, controller/processor 240, memory 242, and/or scheduler 246) may transmit a configuration message to a UE, as described above in connection with FIGS. 6-9.

As shown in FIG. 13, in some aspects, process 1100 may include receiving a first random access message from the UE (block 1320). For example, the base station (e.g., using transmit processor 220, TX MIMO processor 230, modulator 232, antenna 234, controller/processor 240, memory 242, and/or scheduler 246) may transmit a configuration message to a UE, as described above in connection with FIGS. 6-9.

As shown in FIG. 13, in some aspects, process 1100 may include transmitting a random access response to the UE with repetition (block 1330). For example, the base station (e.g., using transmit processor 220, TX MIMO processor 230, modulator 232, antenna 234, controller/processor 240, memory 242, and/or scheduler 246) may transmit a random access response to the UE with repetition, as described above in connection with FIGS. 6-9.

As shown in FIG. 13, in some aspects, process 1100 may include transmitting a DMRS in a control data candidate of a set of control data candidates (block 1340). For example, the base station (e.g., using transmit processor 220, TX MIMO processor 230, modulator 232, antenna 234, controller/processor 240, memory 242, and/or scheduler 246) may transmit a DMRS in a control data candidate of a set of control data candidates, as described above in connection with FIGS. 6-9.

In some aspects, the DMRS may be initialized using a configuration identifier. In such examples, the configuration identifier may correspond to a number of repetitions of the control data candidates. In some aspects, the base station may indicate the configuration identifier via an RMSI message (e.g., via the configuration message). In some aspects, the configuration identifier may be based on a physical cell identifier, a configured rule, and/or one or more parameters indicated in an RMSI message. In some aspects, the configuration identifier may be based on a set of cyclic shifts. In such examples, each cyclic shift of the set of cyclic shifts may correspond to a respective number of repetitions of the control data candidates. In some aspects, the set of cyclic shifts may be indicated by the base station via an RMSI message, may be configured by the base station via RRC signaling, and/or may be based on a physical cell identifier. In some aspects, the configuration identifier may correspond to a set of orthogonal cover codes applied to a DMRS in the control data candidate. In some such aspects, the set of orthogonal cover codes may be configured for control data.

In some aspects, the configuration identifier may indicate a sequence of DMRS associated with respective repetitions of the control data candidates. In some aspects, the sequence of DMRS may include one or more repetitions of the DMRS and a DMRS for a random access message without repetition. In such examples, the DMRS for the random access message without repetition may be initialized via a configurable identifier, such as a primary cell identifier. In some aspects, the DMRS for the random access message without repetition may be included in a last control data candidate of the set of control data candidates. In some aspects, a location of the last control data candidate may correspond to a k0 slot offset.

In some aspects, the sequence of DMRS may include one or more repetitions of the DMRS. In such examples, the sequence of DMRS may not include a DMRS for the random access message without repetition. In some aspects, a legacy UE may be unable to detect the sequence of DMRS.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
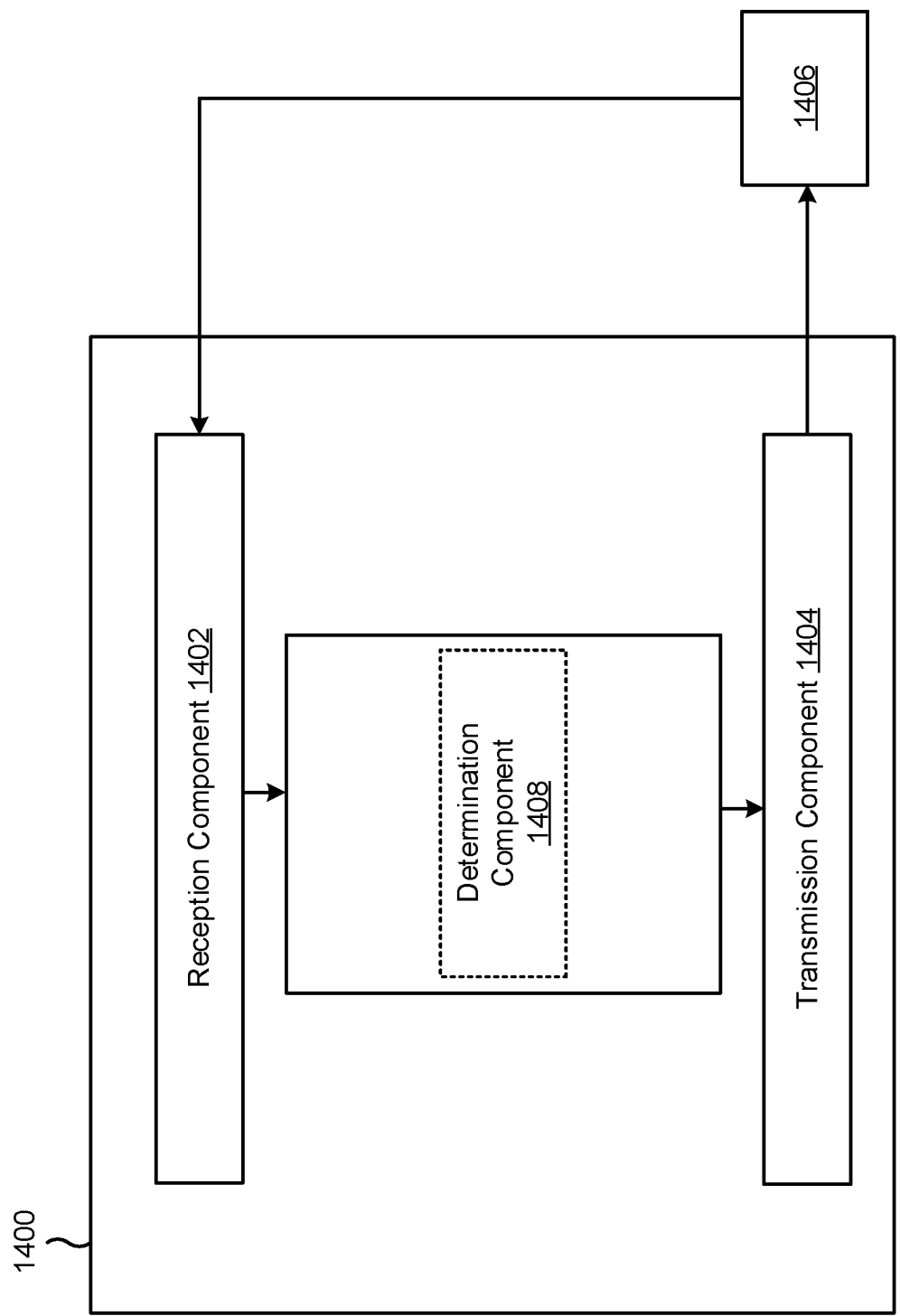
FIGS. 14-17 are block diagrams of example apparatuses for wireless communication, in accordance with the present disclosure.

FIG. 14 is a block diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include one or more of a determination component 1408, among other examples.

In some aspects, the apparatus 1400 may be configured to perform one or more operations described herein in connection with FIGS. 6-9. Additionally or alternatively, the apparatus 1400 may be configured to perform one or more processes described herein, such as process 1000 of FIG. 10, or a combination thereof. In some aspects, the apparatus 1400 and/or one or more components shown in FIG. 14 may include one or more components of the UE described above in connection with FIG. 2. Additionally, or alternatively, one or more components shown in FIG. 14 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the UE described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the UE described above in connection with FIG. 2. In some aspects, the transmission component 1404 may be co-located with the reception component 1402 in a transceiver.

The reception component 1402 may receive an indication of an alternative configuration associated with DMRSs for one or more repetitions of a PDCCH communication associated with an RAR message. The reception component 1402 may receive a repetition of the PDCCH communication that includes a DMRS that does not use the alternative configuration. The reception component 1402 may receive the one or more repetitions of the PDCCH communication that include DMRSs that use the alternative configuration.

The determination component 1408 may determine a timing of a PDSCH communication associated with the RAR message based at least in part on a slot in which the repetition of the PDCCH communication that includes the DMRS that does not use the alternative configuration is received. In some aspects, the determination component 1408 may include a receive processor, a transmit MIMO processor, a transmit processor, a controller/processor, a memory, or a combination thereof, of the UE described above in connection with FIG. 2.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

Figure 15:
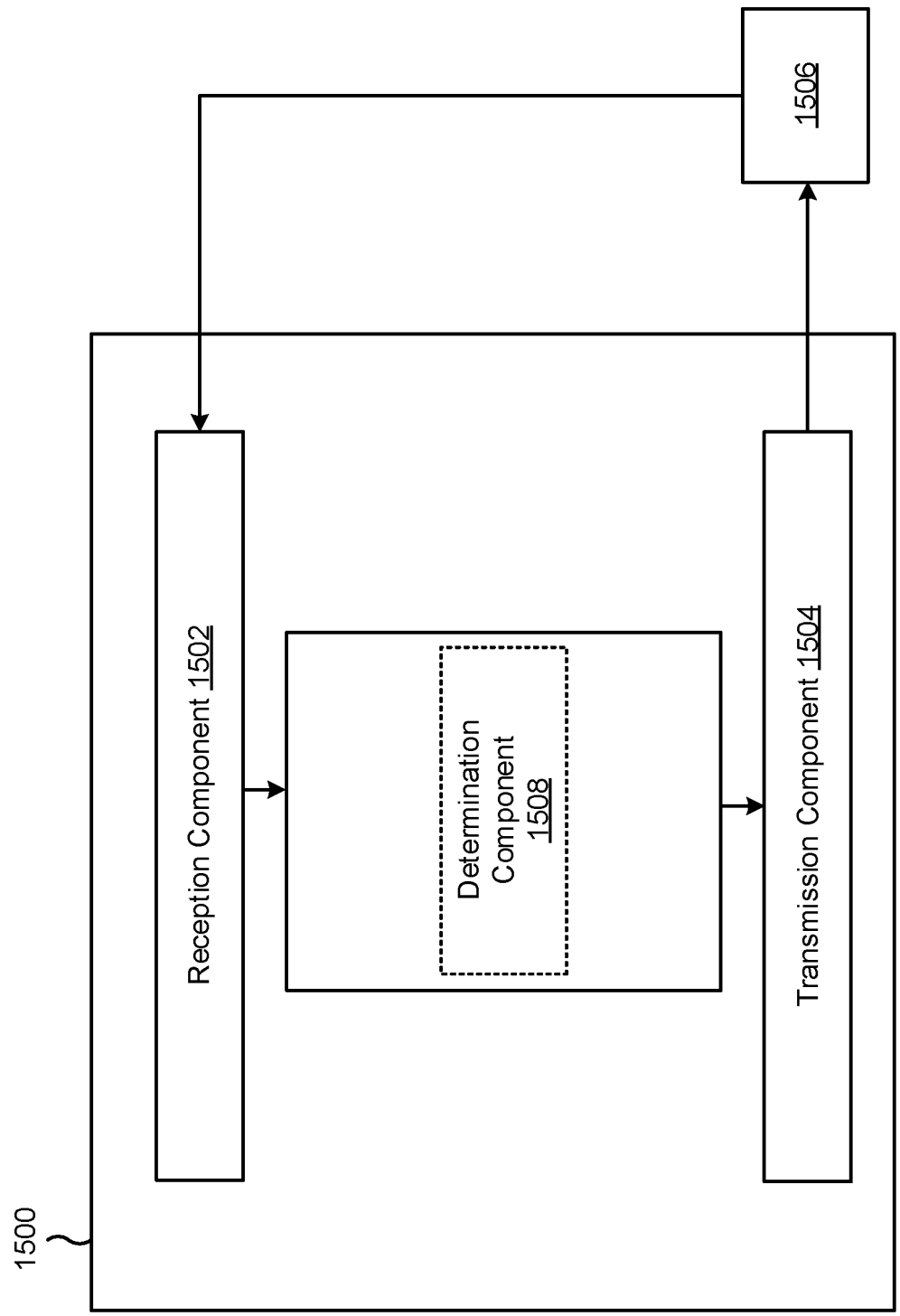

FIG. 15 is a block diagram of an example apparatus 1500 for wireless communication. The apparatus 1500 may be a base station, or a base station may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include one or more of a determination component 1508, among other examples.

In some aspects, the apparatus 1500 may be configured to perform one or more operations described herein in connection with FIGS. 6-9. Additionally or alternatively, the apparatus 1500 may be configured to perform one or more processes described herein, such as process 1100 of FIG. 11, or a combination thereof. In some aspects, the apparatus 1500 and/or one or more components shown in FIG. 15 may include one or more components of the base station described above in connection with FIG. 2. Additionally, or alternatively, one or more components shown in FIG. 15 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the base station described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the base station described above in connection with FIG. 2. In some aspects, the transmission component 1504 may be co-located with the reception component 1502 in a transceiver.

The transmission component 1504 may transmit an indication of an alternative configuration associated with DMRSs for one or more repetitions of a PDCCH communication associated with an RAR message. The transmission component 1504 may transmit a repetition of the PDCCH communication that includes a DMRS that does not use the alternative configuration. The transmission component 1504 may transmit the one or more repetitions of the PDCCH communication that include DMRSs that use the alternative configuration. The determination component 1508 may determine that a timing of a PDSCH communication associated with the RAR message is to be based at least in part on a slot in which the repetition of the PDCCH communication that includes the DMRS that does not use the alternative configuration is transmitted. In some aspects, the determination component 1508 may include a receive processor, a transmit MIMO processor, a transmit processor, a controller/processor, a memory, or a combination thereof, of the base station described above in connection with FIG. 2

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

Figure 16:
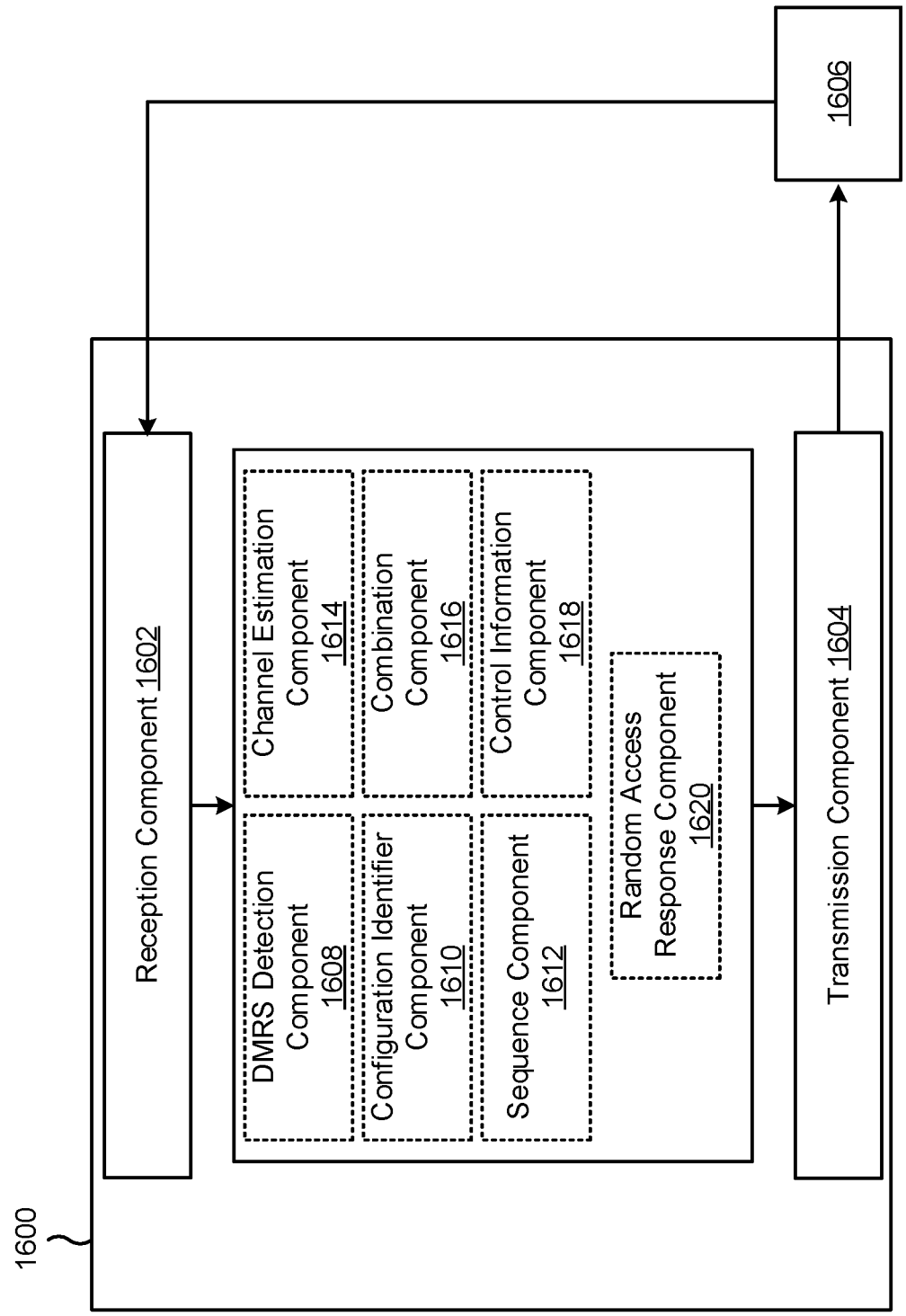

FIG. 16 is a block diagram of an example apparatus 1600 for wireless communication. The apparatus 1600 may be a UE, or a UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include one or more of a DMRS detection component 1608, a configuration identifier component 1610, a sequence component 1612, a channel estimation component 1614, a combination component 1616, a control information component 1618, and/or a random access response component 1620, among other examples.

In some aspects, the apparatus 1600 may be configured to perform one or more operations described herein in connection with FIGS. 6-9. Additionally or alternatively, the apparatus 1600 may be configured to perform one or more processes described herein, such as process 1200 of FIG. 12, or a combination thereof. In some aspects, the apparatus 1600 and/or one or more components shown in FIG. 16 may include one or more components of the UE described above in connection with FIG. 2. Additionally, or alternatively, one or more components shown in FIG. 16 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the UE described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the UE described above in connection with FIG. 2. In some aspects, the transmission component 1604 may be co-located with the reception component 1602 in a transceiver.

The DMRS detection component 1608 may detect a DMRS in a control data candidate of a set of control data candidates received while monitoring for a random access response from a base station. The configuration identifier component 1610 may identify a configuration identifier via the DMRS. The configuration identifier component 1610 may determine a number of repetitions of control data candidates of the set of control data candidates based on the DMRS. The sequence component 1612 may identify a sequence of DMRS associated with respective repetitions of the control data candidates. The channel estimation component 1614 may perform channel estimation for each DMRS associated with a respective control data candidate of the set of control data candidates. The combination component 1616 may combine control data from each control data candidate. The control information component 1618 may decode control information associated with the random access response based on the combined control data. The random access response component 1620 may use the control information to receive and decode the random access response.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
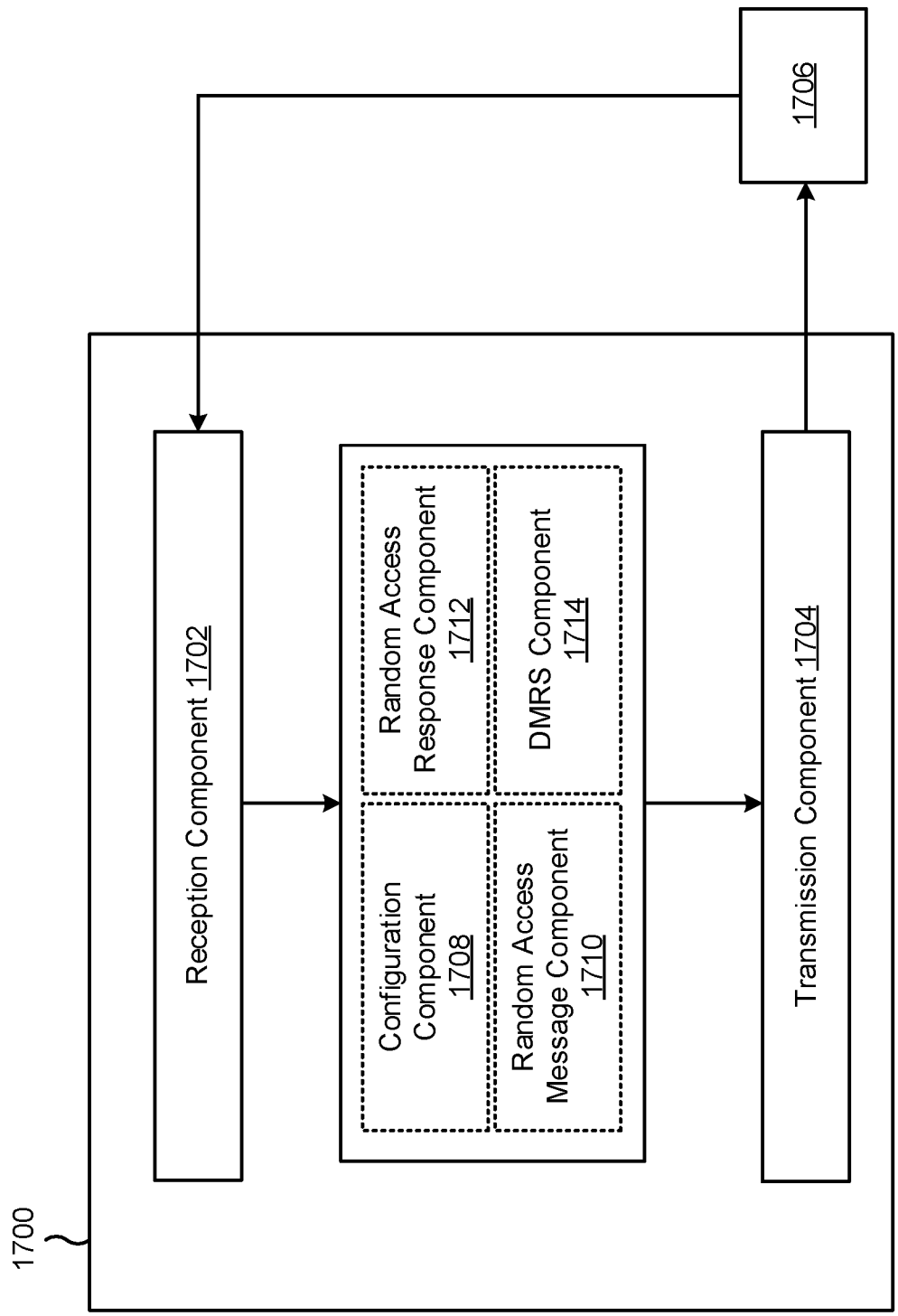

FIG. 17 is a block diagram of an example apparatus 1700 for wireless communication. The apparatus 1700 may be a base station, or a base station may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include one or more of a configuration component 1708, a random access message component 1710, a random access response component 1712, and/or a DMRS component 1714, among other examples.

In some aspects, the apparatus 1700 may be configured to perform one or more operations described herein in connection with FIGS. 6-9. Additionally or alternatively, the apparatus 1700 may be configured to perform one or more processes described herein, such as process 1300 of FIG. 13, or a combination thereof. In some aspects, the apparatus 1700 and/or one or more components shown in FIG. 17 may include one or more components of the base station described above in connection with FIG. 2. Additionally, or alternatively, one or more components shown in FIG. 17 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1706. In some aspects, the reception component 1702 may include one or more antennas, a demodulator, a MIMO detector, a receive processor, a controller/processor, a memory, or a combination thereof, of the base station described above in connection with FIG. 2.

The transmission component 1704 may transmit communications, such as reference signals, control information, data communications, or a combination thereof, to the apparatus 1706. In some aspects, one or more other components of the apparatus 1706 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modulator, a transmit MIMO processor, a transmit processor, a controller/processor, a memory, or a combination thereof, of the base station described above in connection with FIG. 2. In some aspects, the transmission component 1704 may be co-located with the reception component 1702 in a transceiver.

The transmission component 1704 and/or the configuration component 1708 may transmit a configuration message to a UE. The reception component 1702 and/or the random access message component 1710 may receive a first random access message from the UE. The transmission component 1704 and/or the random access response component 1712 may transmit a random access response to the UE with repetition. The transmission component 1704 and/or the DMRS component 1714 may transmit a DMRS in a control data candidate of a set of control data candidates.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally or alternatively, a set of (one or more) components shown in FIG. 17 may perform one or more functions described as being performed by another set of components shown in FIG. 17.

The following provides an overview of some Aspects of the present disclosure:

Aspect 1: A method of wireless communication performed by a user equipment (UE), comprising: receiving an indication of an alternative configuration associated with demodulation reference signals (DMRSs) for one or more repetitions of a physical downlink control channel (PDCCH) communication associated with a random access response (RAR) message; receiving a repetition of the PDCCH communication that includes a DMRS that does not use the alternative configuration; and receiving the one or more repetitions of the PDCCH communication that include DMRSs that use the alternative configuration.

Aspect 2: The method of Aspect 1, wherein the alternative configuration is at least one of: an alternative DMRS sequence of the DMRSs, an orthogonal cover code pattern for the DMRSs, or an alternative resource location of the DMRSs.

Aspect 3: The method of any of Aspects 1-2, wherein the RAR message is a message 2 of a random access procedure.

Aspect 4: The method of any of Aspects 1-3, further comprising: determining a timing of a physical downlink shared channel communication associated with the RAR message based at least in part on a slot in which the repetition of the PDCCH communication that includes the DMRS that does not use the alternative configuration is received.

Aspect 5: The method of any of Aspects 1-4, wherein receiving the repetition of the PDCCH communication that includes the DMRS that does not use the alternative configuration comprises: receiving the repetition of the PDCCH communication that includes the DMRS that does not use the alternative configuration in a last monitoring occasion of a set of aggregated monitoring occasions associated with repetitions of the PDCCH communication.

Aspect 6: The method of any of Aspects 1-5, wherein receiving the indication of the alternative configuration associated with DMRSs for one or more repetitions of the PDCCH communication associated with the RAR message comprises: receiving a remaining minimum system information (RMSI) communication indicating the alternative configuration.

Aspect 7: The method of Aspect 6, wherein receiving the RMSI communication indicating the alternative configuration comprises: receiving the RMSI communication indicating a cyclic shift to be applied to a DMRS sequence of the DMRSs for one or more repetitions of the PDCCH communication.

Aspect 8: The method of any of Aspects 1-7, wherein receiving the indication of the alternative configuration associated with DMRSs for the one or more repetitions of the PDCCH communication associated with the RAR message comprises: receiving an indication of a cell identifier associated with a base station that is transmitting the one or more repetitions of the PDCCH communication; and determining the alternative configuration based at least in part on the cell identifier.

Aspect 9: The method of Aspect 8, wherein determining the alternative configuration based at least in part on the cell identifier comprises: determining a cyclic shift to be applied to a DMRS sequence of the DMRSs for the one or more repetitions of the PDCCH communication based at least in part on the cell identifier.

Aspect 10: The method of any of Aspects 1-9, wherein receiving the indication of the alternative configuration associated with DMRSs for the one or more repetitions of the PDCCH communication associated with the RAR message comprises: receiving a configuration for monitoring for a plurality of repetitions of the PDCCH communication associated with the RAR message; and determining, based at least in part on a stored configuration, the alternative configuration associated with DMRSs for the one or more repetitions, of the plurality of repetitions, of the PDCCH communication.

Aspect 11: The method of any of Aspects 1-10, wherein receiving the repetition of the PDCCH communication that includes the DMRS that does not use the alternative configuration comprises: receiving the DMRS of the repetition of the PDCCH communication in a first resource location; and wherein receiving the one or more repetitions of the PDCCH communication that include DMRSs that use the alternative configuration comprises: receiving the DMRSs of the one or more repetitions of the PDCCH communication in a second resource location.

Aspect 12: A method of wireless communication performed by a base station, comprising: transmitting an indication of an alternative configuration associated with demodulation reference signals (DMRSs) for one or more repetitions of a physical downlink control channel (PDCCH) communication associated with a random access response (RAR) message; transmitting a repetition of the PDCCH communication that includes a DMRS that does not use the alternative configuration; and transmitting the one or more repetitions of the PDCCH communication that include DMRSs that use the alternative configuration.

Aspect 13: The method of Aspect 12, wherein the alternative configuration is at least one of: an alternative DMRS sequence of the DMRSs, an orthogonal cover code pattern for the DMRSs, or an alternative resource location of the DMRSs.

Aspect 14: The method of any of Aspects 12-13, wherein the RAR message is a message 2 of a random access procedure.

Aspect 15: The method of any of Aspects 12-14, wherein transmitting the repetition of the PDCCH communication that includes the DMRS that does not use the alternative configuration comprises: transmitting the repetition of the PDCCH communication that includes the DMRS that does not use the alternative configuration in a last monitoring occasion of a set of aggregated monitoring occasions associated with repetitions of the PDCCH communication.

Aspect 16: The method of any of Aspects 12-15, wherein transmitting the indication of the alternative configuration associated with DMRSs for one or more repetitions of the PDCCH communication associated with the RAR message comprises: transmitting a remaining minimum system information (RMSI) communication indicating the alternative configuration.

Aspect 17: The method of Aspect 16, wherein transmitting the RMSI communication indicating the alternative configuration comprises: transmitting the RMSI communication indicating a cyclic shift to be applied to a DMRS sequence of the DMRSs for one or more repetitions of the PDCCH communication.

Aspect 18: The method of any of Aspects 12-17, wherein transmitting the indication of the alternative configuration associated with DMRSs for the one or more repetitions of the PDCCH communication associated with the RAR message comprises: transmitting an indication of a cell identifier associated with the base station.

Aspect 19: The method of any of Aspects 12-18, wherein transmitting the indication of the alternative configuration associated with DMRSs for the one or more repetitions of the PDCCH communication associated with the RAR message comprises: transmitting a configuration for one or more user equipment (UEs) for monitoring for a plurality of repetitions of the PDCCH communication associated with the RAR message.

Aspect 20: The method of any of Aspects 12-19, wherein transmitting the repetition of the PDCCH communication that includes the DMRS that does not use the alternative configuration comprises: transmitting the DMRS of the repetition of the PDCCH communication in a first resource location; and wherein transmitting the one or more repetitions of the PDCCH communication that include DMRSs that use the alternative configuration comprises: transmitting the DMRSs of the one or more repetitions of the PDCCH communication in a second resource location.

Aspect 21: A method of wireless communication performed by a user equipment (UE), comprising: detecting a demodulation reference signal (DMRS) in a control data candidate of a set of control data candidates received while monitoring for a random access response from a base station; and determining a number of repetitions of control data candidates of the set of control data candidates based on the DMRS, wherein each control data candidate corresponds to at least one of an aggregated slot and an aggregated monitoring occasion.

Aspect 22: The method of Aspect 21, wherein the UE identifies a configuration identifier via the DMRS, and wherein the configuration identifier corresponds to the number of repetitions of the control data candidates.

Aspect 23: The method of Aspect 22, wherein the configuration identifier is indicated via a remaining minimum system information (RMSI) message.

Aspect 24: The method of any of Aspects 22-23, wherein the UE determines the configuration identifier based on at least one of a physical cell identifier, a configured rule, and one or more parameters indicated in a remaining minimum system information (RMSI) message.

Aspect 25: The method of any of Aspects 22-24, wherein the configuration identifier is based on a set of cyclic shifts, and wherein each cyclic shift of the set of cyclic shifts corresponds to a respective number of repetitions of the control data candidates.

Aspect 26: The method of Aspect 25, wherein the set of cyclic shifts is at least one of indicated via a remaining minimum system information (RMSI) message, configured via radio resource control (RRC) signaling, or based on a physical cell identifier.

Aspect 27: The method of any of Aspects 22-26, wherein the UE determines the configuration identifier by applying a set of orthogonal cover codes to a DMRS in the control data candidate.

Aspect 28: The method of Aspect 27, wherein the set of orthogonal cover codes are configured for control data.

Aspect 29: The method of any of Aspects 22-28, wherein the configuration identifier indicates a sequence of DMRS associated with respective repetitions of the control data candidates received while monitoring for the random access response.

Aspect 30: The method of Aspect 29, wherein the sequence of DMRS includes one or more repetitions of the DMRS and a DMRS for a random access message without repetition, wherein the DMRS for the random access message without repetition is initialized via a configurable identifier.

Aspect 31: The method of Aspect 30, wherein the DMRS for the random access message without repetition is included in a last control data candidate of the set of control data candidates, and wherein a location of the last control data candidate corresponds to a k0 slot offset.

Aspect 32: The method of any of Aspects 29-31, wherein the sequence of DMRS includes one or more repetitions of the DMRS.

Aspect 33: The method of any of Aspects 21-32, further comprising: performing channel estimation for each DMRS associated with a respective control data candidate of the set of control data candidates; combining control data from each control data candidate; and decoding control information associated with the random access response based on the combined control data.

Aspect 34: The method of Aspect 33, further comprising using the control information to receive and decode the random access response.

Aspect 35: A method of wireless communication performed by a base station, comprising: receiving a first random access message from a user equipment (UE); transmitting a random access response to the UE with repetition; and transmitting a demodulation reference signal (DMRS) in a control data candidate of a set of control data candidates, wherein the DMRS indicates that the random access response is transmitted with repetition.

Aspect 36: The method of Aspect 35, wherein the DMRS is initialized using a configuration identifier, and wherein the configuration identifier corresponds to a number of repetitions of the control data candidates.

Aspect 37: The method of Aspect 36, wherein the base station indicates the configuration identifier via a remaining minimum system information (RMSI) message.

Aspect 38: The method of any of Aspects 36-37, wherein the configuration identifier is based on at least one of a physical cell identifier, a configured rule, and one or more parameters indicated in a remaining minimum system information (RMSI) message.

Aspect 39: The method of any of Aspects 36-38, wherein the configuration identifier is based on a set of cyclic shifts, and wherein each cyclic shift of the set of cyclic shifts corresponds to a respective number of repetitions of the control data candidates.

Aspect 40: The method of Aspect 39, wherein the set of cyclic shifts is at least one of indicated via a remaining minimum system information (RMSI) message, configured via radio resource control (RRC) signaling, or based on a physical cell identifier.

Aspect 41: The method of any of Aspects 36-40, wherein the configuration identifier corresponds to a set of orthogonal cover codes applied to a DMRS in the control data candidate.

Aspect 42: The method of Aspect 41, wherein the set of orthogonal cover codes are configured for control data.

Aspect 43: The method of any of Aspects 36-42, wherein the configuration identifier indicates a sequence of DMRS associated with respective repetitions of the control data candidates.

Aspect 44: The method of Aspect 43, wherein the sequence of DMRS includes one or more repetitions of the DMRS and a DMRS for a random access message without repetition, wherein the DMRS for the random access message without repetition is initialized via a configurable identifier.

Aspect 45: The method of Aspect 44, wherein the DMRS for the random access message without repetition is included in a last control data candidate of the set of control data candidates, and wherein a location of the last control data candidate corresponds to a k0 slot offset.

Aspect 46: The method of any of Aspects 43-45, wherein the sequence of DMRS includes one or more repetitions of the DMRS.

Aspect 47: A method of wireless communication performed by a user equipment (UE), comprising: receiving an indication of an alternative configuration associated with demodulation reference signals (DMRSs) for one or more repetitions of a physical downlink control channel (PDCCH) communication associated with a random access response (RAR) message; and receiving at least one repetition of the PDCCH communication that includes a DMRS that uses the alternative configuration.

Aspect 48: The method of Aspect 47, further comprising: receiving a repetition of the PDCCH communication that includes a DMRS that does not use the alternative configuration.

Aspect 49: The method of any of Aspects 47-48, wherein the alternative configuration is at least one of: an alternative DMRS sequence of the DMRSs, an orthogonal cover code pattern for the DMRSs, or an alternative resource location of the DMRSs.

Aspect 50: The method of any of Aspects 47-49, further comprising: determining a timing of a physical downlink shared channel communication associated with the RAR message based at least in part on a slot in which a repetition of the PDCCH communication that includes the DMRS that does not use the alternative configuration is received.

Aspect 51: The method of any of Aspects 47-50, further comprising: receiving a repetition of the PDCCH communication that includes the DMRS that does not use the alternative configuration in a last monitoring occasion of a set of aggregated monitoring occasions associated with repetitions of the PDCCH communication.

Aspect 52: The method of any of Aspects 47-51, wherein receiving the indication of the alternative configuration associated with DMRSs for one or more repetitions of the PDCCH communication associated with the RAR message comprises: receiving a remaining minimum system information (RMSI) communication indicating the alternative configuration.

Aspect 53: The method of Aspect 52, wherein receiving the RMSI communication indicating the alternative configuration comprises: receiving the RMSI communication indicating a cyclic shift to be applied to a DMRS sequence of the DMRSs for one or more repetitions of the PDCCH communication.

Aspect 54: The method of any of Aspects 47-53, wherein receiving the indication of the alternative configuration associated with DMRSs for the one or more repetitions of the PDCCH communication associated with the RAR message comprises: receiving an indication of a cell identifier associated with a base station that is transmitting the one or more repetitions of the PDCCH communication; and determining the alternative configuration based at least in part on the cell identifier.

Aspect 55: The method of Aspect 54, wherein determining the alternative configuration based at least in part on the cell identifier comprises: determining a cyclic shift to be applied to a DMRS sequence of the DMRSs for the one or more repetitions of the PDCCH communication based at least in part on the cell identifier.

Aspect 56: The method of any of Aspects 47-55, wherein receiving the indication of the alternative configuration associated with DMRSs for the one or more repetitions of the PDCCH communication associated with the RAR message comprises: receiving a configuration for monitoring for a plurality of repetitions of the PDCCH communication associated with the RAR message; and determining, based at least in part on a stored configuration, the alternative configuration associated with DMRSs for the one or more repetitions, of the plurality of repetitions, of the PDCCH communication.

Aspect 57: The method of any of Aspects 47-56, further comprising: receiving the DMRS, that does not use the alternative configuration, of the repetition of the PDCCH communication in a first resource location; and wherein receiving the at least one repetition of the PDCCH communication that include the DMRS that uses the alternative configuration comprises: receiving the DMRS of at least one repetition of the PDCCH communication in a second resource location.

Aspect 58: The method of any of Aspects 47-57, further comprising: detecting a demodulation reference signal (DMRS) in a control data candidate of a set of control data candidates received while monitoring for the RAR; and determining a number of repetitions of control data candidates of the set of control data candidates based on the DMRS, wherein each control data candidate corresponds to at least one of an aggregated slot and an aggregated monitoring occasion.

Aspect 59: The method of Aspect 58, wherein the UE identifies a configuration identifier via the DMRS, and wherein the configuration identifier corresponds to the number of repetitions of the control data candidates.

Aspect 60: A method of wireless communication performed by a base station, comprising: transmitting an indication of an alternative configuration associated with demodulation reference signals (DMRSs) for one or more repetitions of a physical downlink control channel (PDCCH) communication associated with a random access response (RAR) message; and transmitting at least one repetition of the PDCCH communication that includes a DMRS that uses the alternative configuration.

Aspect 61: The method of Aspect 60, further comprising: transmitting a repetition of the PDCCH communication that includes a DMRS that does not use the alternative configuration.

Aspect 62: The method of any of Aspects 60-61, wherein the alternative configuration is at least one of: an alternative DMRS sequence of the DMRSs, an orthogonal cover code pattern for the DMRSs, or an alternative resource location of the DMRSs.

Aspect 63: The method of any of Aspects 60-62, wherein the RAR message is a message 2 of a random access procedure.

Aspect 64: The method of any of Aspects 60-63, further comprising: transmitting a repetition of the PDCCH communication that includes a DMRS that does not use the alternative configuration in a last monitoring occasion of a set of aggregated monitoring occasions associated with repetitions of the PDCCH communication.

Aspect 65: The method of any of Aspects 60-64, wherein transmitting the indication of the alternative configuration associated with DMRSs for one or more repetitions of the PDCCH communication associated with the RAR message comprises: transmitting a remaining minimum system information (RMSI) communication indicating the alternative configuration.

Aspect 66: The method of Aspect 65, wherein transmitting the RMSI communication indicating the alternative configuration comprises: transmitting the RMSI communication indicating a cyclic shift to be applied to a DMRS sequence of the DMRSs for one or more repetitions of the PDCCH communication.

Aspect 67: The method of any of Aspects 60-66, wherein transmitting the indication of the alternative configuration associated with DMRSs for the one or more repetitions of the PDCCH communication associated with the RAR message comprises: transmitting an indication of a cell identifier associated with the base station.

Aspect 68: The method of any of Aspects 60-67, wherein transmitting the indication of the alternative configuration associated with DMRSs for the one or more repetitions of the PDCCH communication associated with the RAR message comprises: transmitting a configuration for one or more user equipment (UEs) for monitoring for a plurality of repetitions of the PDCCH communication associated with the RAR message.

Aspect 69: The method of any of Aspects 60-68, wherein transmitting the repetition of the PDCCH communication that includes the DMRS that does not use the alternative configuration comprises: transmitting the DMRS of the repetition of the PDCCH communication in a first resource location; and wherein transmitting the one or more repetitions of the PDCCH communication that include DMRSs that use the alternative configuration comprises: transmitting the DMRSs of the one or more repetitions of the PDCCH communication in a second resource location.

Aspect 70: The method of any of Aspects 60-69, wherein transmitting the at least one repetition of the PDCCH communication that includes the DMRS that uses the alternative configuration indicates that the RAR is transmitted with repetition.

Aspect 71: An apparatus for wireless communication at a device, comprising a processor; memory coupled with the processor; and instructions stored in the memory and executable by the processor to cause the apparatus to perform the method of one or more of Aspects 1-11, 21-34, and/or 47-59.

Aspect 72: A device for wireless communication, comprising a memory and one or more processors coupled to the memory, the one or more processors configured to perform the method of one or more of Aspects 1-11, 21-34, and/or 47-59.

Aspect 73: An apparatus for wireless communication, comprising at least one means for performing the method of one or more of Aspects 1-11, 21-34, and/or 47-59.

Aspect 74: A non-transitory computer-readable medium storing code for wireless communication, the code comprising instructions executable by a processor to perform the method of one or more of Aspects 1-11, 21-34, and/or 47-59.

Aspect 75: A non-transitory computer-readable medium storing a set of instructions for wireless communication, the set of instructions comprising one or more instructions that, when executed by one or more processors of a device, cause the device to perform the method of one or more of Aspects 1-11, 21-34, and/or 47-59.

Aspect 76: An apparatus for wireless communication at a device, comprising a processor; memory coupled with the processor; and instructions stored in the memory and executable by the processor to cause the apparatus to perform the method of one or more of Aspects 12-20, 35-46, and/or 60-70.

Aspect 77: A device for wireless communication, comprising a memory and one or more processors coupled to the memory, the one or more processors configured to perform the method of one or more of Aspects 12-20, 35-46, and/or 60-70.

Aspect 78: An apparatus for wireless communication, comprising at least one means for performing the method of one or more of Aspects 12-20, 35-46, and/or 60-70.

Aspect 79: A non-transitory computer-readable medium storing code for wireless communication, the code comprising instructions executable by a processor to perform the method of one or more of Aspects 12-20, 35-46, and/or 60-70.

Aspect 80: A non-transitory computer-readable medium storing a set of instructions for wireless communication, the set of instructions comprising one or more instructions that, when executed by one or more processors of a device, cause the device to perform the method of one or more of Aspects 12-20, 35-46, and/or 60-70.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving an indication of an alternative configuration associated with a physical downlink control channel (PDCCH) communication associated with a random access response (RAR) message;
   receiving one or more repetitions of the PDCCH communication associated with the RAR message;
   determining whether at least one of the one or more repetitions of the PDCCH communication includes a demodulation reference signal (DMRS) that uses the alternative configuration;
   decoding a timing parameter for a timing of the RAR message, included in the PDCCH communication, based on the one or more repetitions of the PDCCH communication; and
   interpreting the timing parameter to determine the timing of the RAR message based on the determination of whether at least one of the one or more repetitions of the PDCCH communication includes a DMRS that uses the alternative configuration.

2. The method of claim 1, further comprising:
   receiving a repetition, of the one or more repetitions of the PDCCH communication, that includes a DMRS that uses the alternative configuration; and
   receiving another repetition, of the one or more repetitions of the PDCCH communication, that includes a DMRS that does not use the alternative configuration.

3. The method of claim 1, wherein the alternative configuration further indicates an alternative DMRS sequence.

4. The method of claim 1, wherein determining the timing of the RAR message comprises:
   determining a timing of a physical downlink shared channel communication associated with the RAR message based at least in part on a slot in which a repetition, of the one or more repetitions of the PDCCH communication, that includes a DMRS that does not use the alternative configuration is received.

5. The method of claim 1, further comprising:
   receiving, in a last monitoring occasion of a set of aggregated monitoring occasions associated with repetitions of the PDCCH communication, a repetition, of the one or more repetitions of the PDCCH communication, that includes a DMRS that does not use the alternative configuration.

6. The method of claim 1, wherein receiving the indication of the alternative configuration comprises:
   receiving a remaining minimum system information (RMSI) communication indicating the alternative configuration.

7. The method of claim 1, wherein the alternative configuration further indicates a cyclic shift to be applied to a DMRS sequence.

8. The method of claim 1, wherein receiving the indication of the alternative configuration comprises:
   receiving an indication of a cell identifier associated with a base station; and determining the alternative configuration based at least in part on the cell identifier.

9. The method of claim 8, wherein determining the alternative configuration based at least in part on the cell identifier comprises:
  determining a cyclic shift to be applied to a DMRS sequence based at least in part on the cell identifier.

10. The method of claim 1, wherein receiving the indication of the alternative configuration comprises:
  receiving a configuration for monitoring for a plurality of repetitions of the PDCCH communication associated with the RAR message; and
  determining, based at least in part on a stored configuration, the alternative configuration.

11. The method of claim 2, wherein the DMRS that uses or does not use the alternative configuration is received in a first resource location or a second resource location, respectively.

12. The method of claim 1, further comprising:
  detecting a DMRS, that uses the alternative configuration, in a control data candidate of a set of control data candidates received while monitoring for the RAR; and
  determining a number of repetitions of control data candidates of the set of control data candidates based on the DMRS that uses the alternative configuration, wherein each control data candidate corresponds to at least one of an aggregated slot and an aggregated monitoring occasion.

13. The method of claim 12, further comprising:
  identifying a configuration identifier via the DMRS that uses the alternative configuration,
  wherein the configuration identifier corresponds to the number of repetitions of the control data candidates.

14. A user equipment (UE) for wireless communication, comprising:
  memory; and
  one or more processors, coupled to the memory, configured to:
    receive an indication of an alternative configuration associated with a physical downlink control channel (PDCCH) communication associated with a random access response (RAR) message;
    receive one or more repetitions of the PDCCH communication associated with the RAR message;
    determine whether at least one of the one or more repetitions of the PDCCH communication includes a demodulation reference signal (DMRS) that uses the alternative configuration;
    decode a timing parameter for a timing of the RAR message, included in the PDCCH communication, based on the one or more repetitions of the PDCCH communication; and
    interpret the timing parameter to determine the timing of the RAR message based on the determination of whether at least one of the one or more repetitions of the PDCCH communication includes a DMRS that uses the alternative configuration.

15. The UE of claim 14, wherein the one or more processors are further configured to:
  receive a repetition, of the one or more repetitions of the PDCCH communication, that includes a DMRS that uses the alternative configuration; and
  receive another repetition, of the one or more repetitions of the PDCCH communication, that includes a DMRS that does not use the alternative configuration.

16. The UE of claim 14, wherein the alternative configuration further indicates an alternative DMRS sequence.

17. The UE of claim 14, wherein the one or more processors, to determine the timing of the RAR message, are configured to:
  determine a timing of a physical downlink shared channel communication associated with the RAR message based at least in part on a slot in which a repetition, of the one or more repetitions of the PDCCH communication, that includes a DMRS that does not use the alternative configuration is received.

18. The UE of claim 14, wherein the one or more processors are further configured to:
  receive, in a last monitoring occasion of a set of aggregated monitoring occasions associated with repetitions of the PDCCH communication, a repetition, of the one or more repetitions of the PDCCH communication, that includes a DMRS that does not use the alternative configuration.

19. The UE of claim 14, wherein the one or more processors, to receive the indication of the alternative configuration, are configured to:
  receive a remaining minimum system information (RMSI) communication indicating the alternative configuration.

20. The UE of claim 14, wherein the alternative configuration further indicates a cyclic shift to be applied to a DMRS sequence.

21. The UE of claim 14, wherein the one or more processors, to receive the indication of the alternative configuration, are configured to:
  receive an indication of a cell identifier associated with a base station; and determine the alternative configuration based at least in part on the cell identifier.

22. The UE of claim 21, wherein the one or more processors, to determine the alternative configuration based at least in part on the cell identifier, are configured to:
  determine a cyclic shift to be applied to a DMRS sequence based at least in part on the cell identifier.

23. The UE of claim 14, wherein the one or more processors, to receive the indication of the alternative configuration, are configured to:
  receive a configuration for monitoring for a plurality of repetitions of the PDCCH communication associated with the RAR message; and
  determine, based at least in part on a stored configuration, the alternative configuration.

24. The UE of claim 15, wherein the DMRS that uses or does not use the alternative configuration is received in a first resource location or a second resource location, respectively.

25. The UE of claim 14, wherein the one or more processors are further configured to:
  detect a DMRS, that uses the alternative configuration, in a control data candidate of a set of control data candidates received while monitoring for the RAR; and
  determine a number of repetitions of control data candidates of the set of control data candidates based on the DMRS that uses the alternative configuration, wherein each control data candidate corresponds to at least one of an aggregated slot and an aggregated monitoring occasion.

26. The UE of claim 25, wherein the one or more processors are further configured to:
  identify a configuration identifier via the DMRS that uses the alternative configuration, wherein the configuration identifier corresponds to the number of repetitions of the control data candidates.

27. The UE of claim 14,
wherein a DMRS that uses the alternative configuration is detectable by the UE and not a legacy UE, and
wherein a DMRS that does not use the alternative configuration is detectable by the UE and the legacy UE.

28. The UE of claim 14, wherein the one or more processors are further configured to:
receive the RAR message based at least in part on a timing, of a physical downlink shared channel communication (PDSCH) that carries the RAR message, that is based at least in part on a repetition, of the one or more repetitions of the PDCCH communication, that includes a DMRS that does not use the alternative configuration.

29. A non-transitory computer-readable medium storing a set of instructions for wireless communication, the set of instructions comprising:
one or more instructions that, when executed by one or more processors of a user equipment (UE), cause the UE to:
receive an indication of an alternative configuration associated with a physical downlink control channel (PDCCH) communication associated with a random access response (RAR) message;
receive one or more repetitions of the PDCCH communication associated with the RAR message;
determine whether at least one of the one or more repetitions of the PDCCH communication includes a demodulation reference signal (DMRS) that uses the alternative configuration;
decode a timing parameter for a timing of the RAR message, included in the PDCCH communication, based on the one or more repetitions of the PDCCH communication; and
interpret the timing parameter to determine the timing of the RAR message based on the determination of whether at least one of the one or more repetitions of the PDCCH communication includes a DMRS that uses the alternative configuration.

30. An apparatus for wireless communication, comprising:
means for receiving an indication of an alternative configuration associated with a physical downlink control channel (PDCCH) communication associated with a random access response (RAR) message;
means for receiving one or more repetitions of the PDCCH communication associated with the RAR message;
means for determining whether at least one of the one or more repetitions of the PDCCH communication includes a demodulation reference signal (DMRS) that uses the alternative configuration;
means for decoding a timing parameter for a timing of the RAR message, included in the PDCCH communication, based on the one or more repetitions of the PDCCH communication; and means for interpreting the timing parameter to determine the timing of the RAR message based on the determination of whether at least one of the one or more repetitions of the PDCCH communication includes a DMRS that uses the alternative configuration.

* * * * *